US012800879B2

(12) United States Patent
Zhu

(10) Patent No.: US 12,800,879 B2
(45) Date of Patent: Nov. 17, 2026

(54) CAMERA OPTICAL LENS

(71) Applicant: AAC Optics (Suzhou) Co., Ltd., Suzhou (CN)

(72) Inventor: Junyan Zhu, Suzhou (CN)

(73) Assignee: AAC Optics (Suzhou) Co., Ltd., Suzhou (CN)

( * ) Notice: Subject to any disclaimer, the term of this patent is extended or adjusted under 35 U.S.C. 154(b) by 348 days.

(21) Appl. No.: 18/399,781

(22) Filed: Dec. 29, 2023

(65) Prior Publication Data

US 2024/0345368 A1 Oct. 17, 2024

(30) Foreign Application Priority Data

Apr. 11, 2023 (CN) ......................... 202310382268.5

(51) Int. Cl.
*G02B 13/00* (2006.01)
*G02B 9/64* (2006.01)

(52) U.S. Cl.
CPC ........... *G02B 13/0045* (2013.01); *G02B 9/64* (2013.01)

(58) Field of Classification Search
CPC ........ G02B 9/02; G02B 9/64; G02B 13/0045; G02B 13/00; G02B 13/006; G02B 13/06; G02B 17/00; G02B 30/00
See application file for complete search history.

(56) References Cited

U.S. PATENT DOCUMENTS

2017/0293110 A1* 10/2017 Kim ........................ G02B 13/04
2020/0012078 A1* 1/2020 Kuo .......................... G02B 9/64
2022/0326481 A1* 10/2022 Xie ........................... G02B 9/60

OTHER PUBLICATIONS

Gross et al. "Handbook of Optical Systems vol. 3: Aberration Theory and Correction of Optical Systems", Weinheim Germany, WILEY-VCH Verlag Gmbh & Co. KGaA, pp. 377-379 (Year: 2007) (Year: 2007).*

* cited by examiner

*Primary Examiner* — Ricky L Mack
*Assistant Examiner* — Justin W. Hustoft
(74) *Attorney, Agent, or Firm* — Wiersch Law Group

(57) ABSTRACT

Provided is a camera optical lens, including from an object side to an image side: a first lens having a negative refractive power, a second lens having a refractive power, a third lens having a negative refractive power, a fourth lens having a positive refractive power, a fifth lens having a positive refractive power, a sixth lens having a negative refractive power, a seventh lens having a negative refractive power, and an eighth lens having a positive refractive power, and the following relational expressions are satisfied: $6.00 \leq TTL/f \leq 12.00$; $1.70 \leq n1 \leq 2.20$; $3.00 \leq d7/d5 \leq 15.00$; $-4.00 \leq f67/f \leq -2.00$; and $R15/R16 \leq -1.50$. The camera optical lens has excellent optical performance and meets design requirements of large aperture and ultra-wide angle.

11 Claims, 10 Drawing Sheets

10

CAMERA OPTICAL LENS

TECHNICAL FIELD

The present disclosure relates to the field of optical lenses and, in particular, to a camera optical lens suitable for handheld smart devices such as smart phones and digital cameras, and camera apparatus such as monitors and PC lenses.

BACKGROUND

In recent years, with the rise of smart devices, the demand for miniaturized camera lenses has gradually increased. A photosensitive device for general camera lenses is generally a Charge Coupled Devices (CCD) or a Complementary Metal-Oxide Semiconductor devices (CMOS sensors). Due to the precision of semiconductor manufacturing technology, the pixel size of the photosensitive device is reduced, and the existing smart devices have a development trend of excellent function and miniaturized appearance. Therefore, a miniaturized camera lens with excellent imaging quality has becomes the mainstream in the current market.

In order to obtain better imaging quality, the conventional lens mounted on a mobile phone camera mostly adopts a three-lens, four-lens or even five-lens, six-lens and seven-lens structure. However, with the development of technology and the increase of diversified needs of users, the pixel area of the photosensitive device is continuously reducing, and the requirements on the imaging quality are increasing, the eight-lens structure has gradually appeared in the lens design. Although the common eight-lens structure already has good optical performance, the configurations of the refractive power, the lens spacing, and the lens shape are still not sufficiently reasonable, resulting in the lens structure unable to meet design requirements of large-aperture and ultra-wide angle while having excellent optical performance.

SUMMARY

In view of the above-mentioned problems, an object of the present disclosure is to provide a camera optical lens, to meet design requirements of large aperture and ultra-wide angle while having excellent optical performance.

In order to solve the above-mentioned technical problems, an embodiment of the present disclosure provides a camera optical lens, including from an object side to an image side: a first lens having a negative refractive power, a second lens having a refractive power, a third lens having a negative refractive power, a fourth lens having a positive refractive power, a fifth lens having a positive refractive power, a sixth lens having a negative refractive power, a seventh lens having a negative refractive power, and an eighth lens having a positive refractive power. A total track length of the camera optical lens is TTL, a focal length of the camera optical lens is f, a refractive index of the first lens is n1, an on-axis thickness of the third lens is d5, an on-axis thickness of the fourth lens is d7, a combined focal length of the sixth lens and the seventh lens is f67, a central curvature radius of an object-side surface of the eighth lens is R15, and a central curvature radius of an image-side surface of the eighth lens is R16, and following relational expressions are satisfied: $6.00 \le TTL/f \le 12.00$; $1.70 \le n1 \le 2.20$; $3.00 \le d7/d5 \le 15.00$; $-4.00 \le f67/f \le -2.00$; and $R15/R16 \le -1.50$.

As an improvement, an abbe number of the sixth lens is v6, and an abbe number of the seventh lens is v7, and a following relational expression is satisfied: $56.11 \le v6 - v7$.

As an improvement, an object-side surface of the first lens is convex in a paraxial region, and an image-side surface of the first lens is concave in the paraxial region. A focal length of the first lens is f1, a central curvature radius of an object-side surface of the first lens is R1, a central curvature radius of an image-side surface of the first lens is R2, and an on-axis thickness of the first lens is d1, and following relational expressions are satisfied:

$$-4.90 \le f1/f \le -0.92;$$

$$0.80 \le (R1+R2)/(R1-R2) \le 3.09;$$

and $$0.01 \le d1/TTL \le 0.07.$$

As an improvement, an object-side surface of the second lens is concave in a paraxial region, and an image-side surface of the second lens is convex in the paraxial region. A focal length of the second lens is f2, a central curvature radius of an object-side surface of the second lens is R3, a central curvature radius of an image-side surface of the second lens is R4, and an on-axis thickness of the second lens is d3, and following relational expressions are satisfied: $-8.57 \le f2/f \le 7.69$; $-4.08 \le (R3+R4)/(R3-R4) \le 11.62$; and $0.02 \le d3/TTL \le 0.25$.

As an improvement, an object-side surface of the third lens is concave in a paraxial region, and an image-side surface of the third lens is concave in the paraxial region. A focal length of the third lens is f3, a central curvature radius of an object-side surface of the third lens is R5, and a central curvature radius of an image-side surface of the third lens is R6, and following relational expressions are satisfied: $-7.53 \le f3/f \le -1.12$; $-1.53 \le (R5+R6)/(R5-R6) \le 0.53$; and $0.01 \le d5/TTL \le 0.05$.

As an improvement, a focal length of the fourth lens is f4, a central curvature radius of an object-side surface of the fourth lens is R7, a central curvature radius of an image-side surface of the fourth lens is R8, and following relational expressions are satisfied:

$$1.51 \le f4/f \le 9.55;$$

$$-3.63 \le (R7+R8)/(R7-R8) \le 3.14;$$

and $$0.05 \le d7/TTL \le 0.44.$$

As an improvement, an object-side surface of the fifth lens is convex in a paraxial region, and an image-side surface of the fifth lens is convex in the paraxial region. A focal length of the fifth lens is f5, a central curvature radius of an object-side surface of the fifth lens is R9, a central curvature radius of an image-side surface of the fifth lens is R10, and an on-axis thickness of the fifth lens is d9, and following relational expressions are satisfied:

$$0.89 \leq f5/f \leq 3.61; -0.27 \leq (R9+R10)/(R9-R10) \leq 0.61; \text{ and}$$

$$0.04 \leq d9/TTL \leq 0.19.$$

As an improvement, an object-side surface of the sixth lens is convex in a paraxial region, and an image-side surface of the sixth lens is convex in the paraxial region. A focal length of the sixth lens is f6, a central curvature radius of an object-side surface of the sixth lens is R11, a central curvature radius of an image-side surface of the sixth lens is R12, and an on-axis thickness of the sixth lens is d11, and following relational expressions are satisfied:

$$-198.21 \leq f6/f \leq -2.69; 0.12 \leq (R11+R12)/(R11-R12) \leq 0.89; \text{ and}$$

$$0.04 \leq d11/TTL \leq 0.22.$$

As an improvement, an object-side surface of the seventh lens is concave in a paraxial region, and an image-side surface of the seventh lens is concave in the paraxial region. A focal length of the seventh lens is f7, a central curvature radius of an object-side surface of the seventh lens is R13, a central curvature radius of an image-side surface of the seventh lens is R14, and an on-axis thickness of the seventh lens is d13, and following relational expressions are satisfied: $-5.45 \leq f7/f \leq -0.85$; $-1.49 \leq (R13+R14)/(R13-R14) \leq -0.17$; and $0.01 \leq d13/TTL \leq 0.21$.

As an improvement, an object-side surface of the eighth lens is convex in a paraxial region, and an image-side surface of the eighth lens is convex in the paraxial region. A focal length of the eighth lens is f8, and an on-axis thickness of the eighth lens is d15, and following relational expressions are satisfied: $1.15 \leq f8/f \leq 4.46$; and $0.03 \leq d15/TTL \leq 0.14$.

As an improvement, the first lens, the fourth lens, the sixth lens and the seventh lens are made of glass.

As an improvement, a focal number of the camera optical lens is Fno, and a field of view of the camera optical lens is FOV, and following relational expressions are satisfied:

$$Fno \leq 1.80; \text{ and } FOV \geq 159.00°.$$

The present disclosure has the following beneficial effects: the camera optical lens of the present disclosure defines the following parameters: the ratio of the focal length to the total track length, the refractive index of the first lens, the ratio of the on-axis thickness between the fourth lens and the third lens, the ratio of the combined focal length of the sixth lens and the seventh lens to the focal length of the camera optical lens, and the ratio of the central curvature radius of the object-side surface of the eighth lens to the central curvature radius of the image-side surface of the eighth lens, so that the camera optical lens has excellent optical performance, and has characteristics of the large aperture and the ultra-wide angle, which is particularly suitable for a mobile phone camera lens and a WEB camera lens composed of camera elements such as CCD and CMOS with high resolution.

BRIEF DESCRIPTION OF DRAWINGS

In order to better illustrate the technical solutions in embodiments of the present disclosure, the drawings required to be used in the description of the embodiments will be briefly described below. It is appreciated that, the drawings in the following description are only some embodiments of the present disclosure, and for those skilled in the art, other drawings can also be obtained according to these accompanying drawings without creative effort.

DESCRIPTION OF EMBODIMENTS

In order to more clearly illustrate objectives, technical solutions, and advantages of the embodiments of the present disclosure, the technical solutions in the embodiments of the present disclosure are clearly and completely described in details with reference to the drawings. However, those of ordinary skill in the art will appreciate that in various embodiments of the present disclosure, numerous technical details are set forth for the reader to better understand the present disclosure. However, even without these technical details and various variations and modifications based on the following embodiments, the technical solutions claimed in the present disclosure can still be implemented.

First Embodiment

Figure 1:
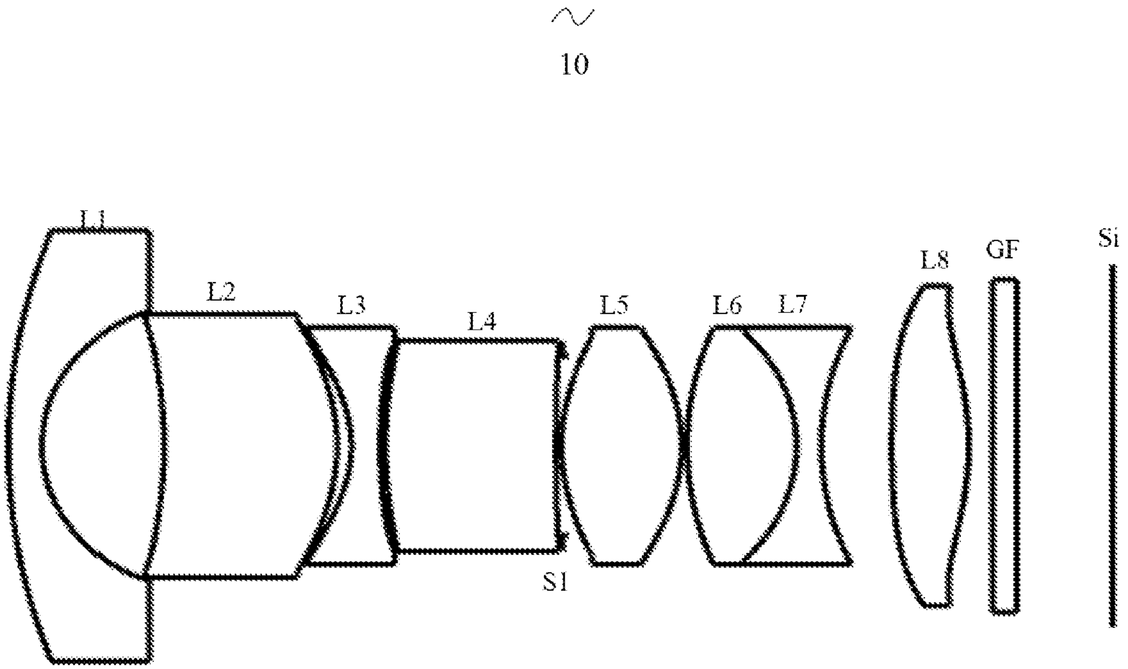
FIG. 1 is a schematic structural diagram of a camera optical lens according to a first embodiment of the present disclosure.

Referring to the drawings, the present disclosure provides a camera optical lens 10. FIG. 1 shows a camera optical lens 10 according to the first embodiment of the present disclosure, and the camera optical lens 10 includes eight lenses. For example, the camera optical lens 10 includes from an object side to an image side: a first lens L1, a second lens L2, a third lens L3, a fourth lens L4, a aperture S1, a fifth lens L5, a sixth lens L6, a seventh lens L7, and an eighth lens L8. An optical element such as a grating filter GF may be disposed between the eighth lens L8 and an image plane Si.

In this embodiment, a total track length of the camera optical lens 10 is defined as TTL, and f represents a focal length of the camera optical lens 10, and the following relational expression is satisfied: $6.00 \le TTL/f \le 12.00$. The ratio between the focal length and the total track length of the camera optical lens 10 is specified, so that the lens may have a longer focal length under the same total track length.

A refractive index of the first lens L1 is defined as n1, and satisfies the following relational expression: $1.70 \le n1 \le 2.20$. The refractive index of the first lens L1 is specified, and the first lens L1 is made of a high-refractive-index material, thereby facilitating reduction of a front-end aperture of the camera optical lens 10 and improvement of the imaging quality.

An on-axis thickness of the third lens L3 is defined as d5, and an on-axis thickness of the fourth lens L4 is defined as d7, and the following relational expression is satisfied: $3.00 \le d7/d5 \le 15.00$. The ratio of the on-axis thickness of the fourth lens L4 to the on-axis thickness of the third lens L3 is specified, thereby helping to reduce the total length of an optical system within the range defined by the relational expression.

A combined focal length of the sixth lens L6 and the seventh lens L7 is defined as f67, and satisfies the following relational expression: $-4.00 \le f67/f \le -2.00$. The combined focal length of the sixth lens L6 and the seventh lens L7 is specified, which controls the light path between the fifth lens L5 and the eighth lens L8, reduces an aberration caused by large-angle light, and makes the lens compact, thereby facilitating miniaturization.

A central curvature radius of an object-side surface of the eighth lens L8 is defined as R15, and a central curvature radius of an image-side surface of the eighth lens L8 is defined as R16, which satisfy the following relational expression: $R15/R16 \le -1.50$. The ratio of the central curvature radius of the object-side surface of the eighth lens L8 to the central curvature radius of the image-side surface of the eighth lens L8 is specified, which defines the shape of the eighth lens L8, thereby reducing the degree of deflection of light passing through the lens and improving the imaging quality.

In this embodiment, when the total track length and the focal length of the camera optical lens 10, the refractive index of the first lens L1, the on-axis thicknesses of the third lens L3 and the fourth lens L4, the combined focal length of the sixth lens L6 and the seventh lens L7, and the central curvature radius of the object-side surface and the image-side surface of the eighth lens L8 all satisfy the foregoing relational expressions, the camera optical lens 10 may have excellent optical performance, and has characteristics of large aperture and ultra-wide angle, which is particularly suitable for a mobile phone camera lens and a WEB camera lens composed of camera elements such as CCD and CMOS with high resolution.

In this embodiment, an abbe number of the sixth lens L6 is defined as v6, and an abbe number of the seventh lens L7 is defined as v7, which satisfy the following relational expression: $56.11 \le v6-v7$. The dispersion coefficient of glued lenses is specified, which effectively corrects the chromatic aberration of the system within a range of the relational expression, so that the chromatic aberration $|LC| \le 8.0$ nm.

In this embodiment, an object-side surface of the first lens L1 is convex in a paraxial region, and an image-side surface of the first lens L1 is concave in the paraxial region. The first lens L1 has a negative refractive power.

A focal length of the first lens L1 is defined as f1, and satisfies the following relational expression: $-4.90 \le f1/f \le -0.92$. When the negative refractive power of the first lens L1 exceeds the upper limit specified value, although it is beneficial for the lens to develop towards the ultra-thin, the negative refractive power of the first lens L1 may be too strong, making it difficult to correct the problem such as aberration, and meanwhile it is not beneficial for the lens to develop towards wide-angle. Similarly, when the negative refractive power of the first lens L1 exceeds the lower limit specified value, the negative refractive power of the first lens L1 may become too weak, and the lens is difficult to develop to ultra-thin. Optionally, $-3.06 \le f1/f \le -1.15$.

A central curvature radius R1 of the object-side surface of the first lens L1 and a central curvature radius R2 of the image-side surface of the first lens L1 satisfy the following relational expression: $0.80 \le (R1+R2)/(R1-R2) \le 3.09$. By reasonably controlling a shape of the first lens L1, the first lens L1 may effectively correct the spherical aberration of the system. Optionally, $1.28 \le (R1+R2)/(R1-R2) \le 2.48$.

An on-axis thickness of the first lens L1 is d1, and the following relational expression is satisfied: $0.01 \le d1/TTL \le 0.07$. This configuration of the first lens L1 is beneficial to achieve ultra-thin. Optionally, $0.01 \le d1/TTL \le 0.05$.

In this embodiment, an object-side surface of the second lens L2 is concave in a paraxial region, and an image-side surface of the second lens L2 is convex in the paraxial region. The second lens L2 has a positive refractive power. In other optional embodiments, the second lens L2 may have a negative refractive power according to actual requirements.

A focal length of the second lens L2 is defined as f2, and the following relational expression is satisfied: $-8.57 \le f2/f \le 7.69$. By controlling the refractive power of the second lens L2 within a reasonable range, it is beneficial to correct the aberration of the optical system. Optionally, $-5.36 \le f2/f \le 6.16$.

A central curvature radius R3 of the object-side surface of the second lens L2 and a central curvature radius R4 of the image-side surface of the second lens L2 satisfy the following relational expression: $-4.08 \le (R3+R4)/(R3-R4) \le 11.62$. The shape of the second lens L2 is specified, and within the range of the relational expression, as the lens develops towards ultra-thin and wide-angles, it is beneficial to correct the on-axis chromatic aberration problem. Optionally, $-2.55 \le (R3+R4)/(R3-R4) \le 9.29$.

An on-axis thickness of the second lens L2 is d3, and the following relational expression is satisfied: $0.02 \le d3/TTL \le 0.25$. This configuration of the second lens L2 is beneficial to achieve ultra-thin. Optionally, $0.04 \le d3/TTL \le 0.20$.

In this embodiment, an object-side surface of the third lens L3 is concave in a paraxial region, and an image-side surface of the third lens L3 is concave in the paraxial region. The third lens L3 has a negative refractive power.

A focal length of the third lens L3 is defined as f3, and satisfies the following relational expression: $-7.53 \le f3/f \le -1.12$. The system can have better imaging quality and lower sensitivity through reasonable distribution of the refractive power. Optionally, $-4.71 \le f3/f \le -1.40$.

A central curvature radius of the object-side surface of the third lens L3 is R5, and a central curvature radius of the image-side surface of the third lens L3 is R6, and the following relational expression is satisfied: $-1.53 \le (R5+R6)/(R5-R6) \le 0.53$. The shape of the third lens L3 is specified, facilitating the molding of the third lens L3. Within the specified range of the relational expression, the deflection of light passing through the lens can be reduced, thereby effectively reducing the aberration. Optionally, $-0.96 \le (R5+R6)/(R5-R6) \le 0.43$.

An on-axis thickness of the third lens L3 satisfies the following relational expression: $0.01 \le d5/TTL \le 0.05$. This configuration of the third lens L3 is beneficial to achieve ultra-thin. Optionally, $0.02 \le d5/TTL \le 0.04$.

In this embodiment, an object-side surface of the fourth lens L4 is convex in a paraxial region, and an image-side surface of the fourth lens L4 is concave in the paraxial region. The fourth lens L4 has a positive refractive power. In other optional embodiments, the object-side surface and the image-side surface of the fourth lens L4 may be provided with other concave or convex distributions.

A focal length of the fourth lens L4 is defined as f4, and satisfies the following relational expression: $1.51 \le f4/f \le 9.55$. The system has better imaging quality and lower sensitivity through reasonable distribution of refractive power. Optionally, $2.41 \le f4/f \le 7.64$.

A central curvature radius of the object-side surface of the fourth lens L4 is R7, and a central curvature radius of the image-side surface of the fourth lens L4 is R8, and the following relational expression is satisfied: $-3.63 \le (R7+R8)/(R7-R8) \le 3.14$. The shape of the fourth lens L4 is specified, and within the range of the relational expression, as the lens develops towards ultra-thin and wide-angles, it is beneficial to correct problems such as the aberration of off-axis chromatic angles. Optionally, $-2.27 \le (R7+R8)/(R7-R8) \le 2.51$.

An on-axis thickness of the fourth lens L4 satisfies the following relational expression: $0.05 \le d7/TTL \le 0.44$. This configuration of the fourth lens L4 beneficial to achieve ultra-thin. Optionally, $0.08 \le d7/TTL \le 0.36$.

In this embodiment, an object-side surface of the fifth lens L5 is convex in a paraxial region, and an image-side surface of the fifth lens L5 is convex in the paraxial region. The fifth lens L5 has a positive refractive power.

A focal length of the fifth lens L5 is defined as f5, and satisfies the following relational expression: $0.89 \le f5/f \le 3.61$. The limitation to the fifth lens L5 may effectively make the light angle of the camera lens smooth, and thus reduce tolerance sensitivity. Optionally, $1.42 \le f5/f \le 2.89$.

A central curvature radius of the object-side surface of the fifth lens L5 is R9, and a central curvature radius of the image-side surface of the fifth lens L5 is R10, and the following relational expression is satisfied: $-0.27 \le (R9+R10)/(R9-R10) \le 0.61$. The shape of the fifth lens L5 is specified, and within the range of the relational expression, as the lens develops towards ultra-thin and wide-angles, it is beneficial to correct problems such as the aberration of off-axis chromatic angles. Optionally, $-0.17 \le (R9+R10)/(R9-R10) \le 0.48$.

An on-axis thickness of the fifth lens L5 is d9, and satisfies the following relational expression: $0.04 \le d9/TTL \le 0.19$. This configuration of the fifth lens L5 beneficial to achieve ultra-thin. Optionally, $0.07 \le d9/TTL \le 0.15$.

In this embodiment, an object-side surface of the sixth lens L6 is convex in a paraxial region, and an image-side surface of the sixth lens L6 is convex in the paraxial region. The sixth lens L6 has a negative refractive power.

A focal length of the sixth lens L6 is defined as f6, and satisfies the following relational expression: $-198.21 \le f6/f \le -2.69$. The system has better imaging quality and lower sensitivity through reasonable distribution of the refractive power. Optionally, $-123.88 \le f6/f \le -3.36$.

A central curvature radius of the object-side surface of the sixth lens L6 is R11, and a central curvature radius of the image-side surface of the sixth lens L6 is R12, and the following relational expression is satisfied: $0.12 \le (R11+R12)/(R11-R12) \le 0.89$. The shape of the sixth lens L6 is specified, and within the range of the relational expression, as the lens develops towards ultra-thin and wide-angles, it is beneficial to correct problems such as the aberration of off-axis chromatic angles. Optionally, $0.19 \le (R11+R12)/(R11-R12) \le 0.71$.

An on-axis thickness of the sixth lens L6 is d11, and satisfies the following relational expression: $0.04 \le d11/TTL \le 0.22$. This configuration of the sixth lens L6 beneficial to achieve ultra-thin. Optionally, $0.06 \le d11/TTL \le 0.18$.

In this embodiment, an object-side surface of the seventh lens L7 is concave in a paraxial region, and an image-side surface of the seventh lens L7 is concave in the paraxial region. The seventh lens L7 has a negative refractive power.

A focal length of the seventh lens L7 is defined as f7, and satisfies the following relational expression: $-5.45 \le f7/f \le -0.85$. The system has better imaging quality and lower sensitivity through reasonable distribution of the refractive power. Optionally, $-3.41 \le f7/f \le -1.06$.

A central curvature radius of the object-side surface of the seventh lens L7 is R13, and a central curvature radius of the image-side surface of the seventh lens L7 is R14, and the following relational expression is satisfied: $-1.49 \le (R13+R14)/(R13-R14) \le -0.17$. The shape of the seventh lens L7 is specified, and within the range of the relational expression, as the lens develops towards ultra-thin and wide-angles, it is beneficial to correct problems such as the aberration of off-axis chromatic angles. Optionally, $-0.93 \le (R13+R14)/(R13-R14) \le -0.21$.

An on-axis thickness of the seventh lens L7 is d13, and satisfies the following relational expression: $0.01 \le d13/TTL \le 0.21$. This configuration of the seventh lens L7 beneficial to achieve ultra-thin. Optionally, $0.02 \le d13/TTL \le 0.17$.

In this embodiment, an object-side surface of the eighth lens L8 is convex in a paraxial region, and an image-side surface of the eighth lens L8 is convex in the paraxial region. The eighth lens L8 has a positive refractive power.

A focal length of the eighth lens L8 is defined as f8, and satisfies the following relational expression: $1.15 \le f8/f \le 4.46$. The system has better imaging quality and lower sensitivity through reasonable distribution of the refractive power. Optionally, $1.84 \le f8/f \le 3.56$.

An on-axis thickness of the eighth lens L8 is d15, and satisfies the following relational expression: $0.03 \le d15/TTL \le 0.14$. This configuration of the eighth lens L8 beneficial to achieve ultra-thin. Optionally, $0.05 \le d15/TTL \le 0.12$.

In this embodiment, the first lens L1, the fourth lens L4, the sixth lens L5 and the seventh lens L7 are made of glass.

In this embodiment, the total track length TTL of the camera optical lens 10 is less than or equal to 33.04 mm, which is beneficial for achieving ultra-thin. Optionally, TTL is less than or equal to 31.53 mm.

With this design, the total track length TTL of the whole camera optical lens 10 can be shortened as much as possible, and the miniaturization design is achieved.

Further, a focal number (aperture F number) of the camera optical lens 10 is Fno, which represents a ratio of an effective focal length to an entrance pupil aperture, and the following relational expression is satisfied: Fno≤1.80, which is beneficial to achieving a large aperture, and thereby having excellent imaging performance. The camera optical lens 10 further satisfies the following relational expression: FOV≥159.00°, which is beneficial to achieving wide angle. When the above relational expression is satisfied, the camera optical lens 10 can meet design requirements of the large aperture and the ultra-wide angle while having excellent optical imaging performance. According to the characteristics of the optical lens 10, the optical lens 10 is particularly suitable for the mobile phone camera lens and the WEB camera lens composed of camera elements such as CCD and CMOS with high resolution.

The camera optical lens 10 of the present disclosure will be described below with examples. The reference signs recited in each example are shown below. The units of the focal length, the on-axis distance, the central curvature radius, the on-axis thickness, the inflection point position, and the arrest point position are mm.

TTL: a total track length (an on-axis distance from the object-side surface of the first lens L1 to the image plane Si), in mm;

Aperture value Fno: refers to a ratio of the effective focal length of the camera optical lens 10 to the entrance pupil diameter.

In an embodiment, the object-side surface and/or the image-side surface of the lens may be further provided with an inflection point and/or an arrest point, so as to meet high-quality imaging requirements. Specific implementable embodiments are described below.

Table 1 and Table 2 show design data of the camera optical lens 10 according to the first embodiment of the present disclosure.

TABLE 1

| | R | | d | | nd | | vd |
|---|---|---|---|---|---|---|---|
| S1 | ∞ | d0 | −11.547 | | | | |
| R1 | 14.164 | d1 | 0.700 | n1 | 2.0033 | v1 | 28.32 |
| R2 | 3.291 | d2 | 2.542 | | | | |
| R3 | −10.875 | d3 | 3.605 | n2 | 1.8514 | v2 | 40.07 |
| R4 | −4.470 | d4 | 0.298 | | | | |
| R5 | −2.906 | d5 | 0.600 | n3 | 1.4959 | v3 | 81.65 |
| R6 | 15.972 | d6 | 0.108 | | | | |
| R7 | 11.392 | d7 | 3.547 | n4 | 2.0007 | v4 | 25.44 |
| R8 | 48.112 | d8 | 0.120 | | | | |
| R9 | 4.574 | d9 | 2.498 | n5 | 1.4959 | v5 | 81.65 |
| R10 | −4.213 | d10 | 0.115 | | | | |
| R11 | 7.002 | d11 | 2.277 | n6 | 1.4970 | v6 | 81.60 |
| R12 | −3.724 | d12 | 0.000 | | | | |
| R13 | −3.724 | d13 | 0.519 | n7 | 1.8052 | v7 | 25.48 |
| R14 | 6.262 | d14 | 1.468 | | | | |
| R15 | 25.020 | d15 | 1.603 | n8 | 1.7738 | v8 | 47.17 |
| R16 | −7.036 | d16 | 0.500 | | | | |
| R17 | ∞ | d17 | 0.500 | ng | 1.5233 | vg | 54.52 |
| R18 | ∞ | d18 | 2.000 | | | | |

The meaning of the reference signs in Table 1 is as follows:

S1: aperture;

R: central curvature radius at the center of the optical surface;

R1: central curvature radius of the object-side surface of the first lens L1;

R2: central curvature radius of the image-side surface of the first lens L1;

R3: central curvature radius of the object-side surface of the second lens L2;

R4: central curvature radius of the image-side surface of the second lens L2;

R5: central curvature radius of the object-side surface of the third lens L3;

R6: central curvature radius of the image-side surface of the third lens L3;

R7: central curvature radius of the object-side surface of the fourth lens L4;

R8: central curvature radius of the image-side surface of the fourth lens L4;

R9: central curvature radius of the object-side surface of the fifth lens L5;

R10: central curvature radius of the image-side surface of the fifth lens L5;

R11: central curvature radius of the object-side surface of the sixth lens L6;

R12: central curvature radius of the image-side surface of the sixth lens L6;

R13: central curvature radius of the object-side surface of the seventh lens L7;

R14: central curvature radius of the image-side surface of the seventh lens L7;

R15: central curvature radius of the object-side surface of the eighth lens L8;

R16: central curvature radius of the image-side surface of the eighth lens L8;

R17: central curvature radius of the object-side surface of the grating filter GF;

R18: central curvature radius of the image-side surface of the grating filter GF;

d: on-axis thickness of the lens or on-axis distance between the lenses;

d0: on-axis distance from the aperture S1 to the object-side surface of the first lens L1 d1: on-axis thickness of the first lens L1;

d2: on-axis distance from the image-side surface of the first lens L1 to the object-side surface of the second lens L2;

d3: on-axis thickness of the second lens L2;

d4: on-axis distance from the image-side surface of the second lens L2 to the object-side surface of the third lens L3;

d5: on-axis thickness of the third lens L3;

d6: on-axis distance from the image-side surface of the third lens L3 to the object-side surface of the fourth lens L4;

d7: on-axis thickness of the fourth lens L4;

d8: on-axis distance from the image-side surface of the fourth lens L4 to the object-side surface of the fifth lens L5;

d9: on-axis thickness of the fifth lens L5;

d10: on-axis distance from the image-side surface of the fifth lens L5 to the object-side surface of the sixth lens L6;

d11: on-axis thickness of the sixth lens L6;

d12: on-axis distance from the image-side surface of the sixth lens L6 to the object-side surface of the seventh lens L7;

d13: on-axis thickness of the seventh lens L7;

d14: on-axis distance from the image-side surface of the seventh lens L7 to the object-side surface of the eighth lens L8;
d15: on-axis thickness of the eighth lens L8;
d16: on-axis distance from the image-side surface of the eighth lens L8 to the object-side surface of the grating filter GF;
d17: on-axis thickness of the grating filter GF;
d18: on-axis distance from the image-side surface of the grating filter GF to the image plane;
nd: refractive index of d line;
n1: refractive index of d line of the first lens L1;
n2: refractive index of d line of the second lens L2;
n3: refractive index of d line of the third lens L3;
n4: refractive index of d line of the fourth lens L4;
n5: refractive index of d line of the fifth lens L5;
n6: refractive index of d line of the sixth lens L6;
n7: refractive index of d line of the seventh lens L7;
n8: refractive index of d line of the eighth lens L8;
ng: refractive index of d line of the grating filter GF;
vd: abbe number;
v1: abbe number of the first lens L1;
v2: abbe number of the second lens L2;
v3: abbe number of the third lens L3;
v4: abbe number of the fourth lens L4;
v5: abbe number of the fifth lens L5;
v6: abbe number of the sixth lens L6;
v7: abbe number of the seventh lens L7;
v8: abbe number of the eighth lens L8; and
vg: abbe number of the grating filter GF.

Table 2 shows aspheric data of each lens in the camera optical lens 10 according to the first embodiment of the present disclosure.

TABLE 2

| | Conic Coefficient | Aspheric coefficient | | | | | | |
|---|---|---|---|---|---|---|---|---|
| | k | A4 | A6 | A8 | A10 | A12 | A14 | A16 |
| R1 | — | — | — | — | — | — | — | — |
| R2 | — | — | — | — | — | — | — | — |
| R3 | −3.0952E+00 | 9.2876E−04 | −1.6543E−04 | 2.1504E−05 | −4.9095E−06 | 6.5918E−07 | −4.9372E−08 | 1.5780E−09 |
| R4 | −3.2536E−01 | 7.1870E−03 | −1.6268E−03 | 2.5824E−04 | −2.1183E−05 | 3.1668E−07 | 8.3961E−08 | −4.6585E−09 |
| R5 | −2.3462E+00 | 9.9827E−03 | −5.7279E−03 | 1.8625E−03 | −3.6627E−04 | 4.3925E−05 | −2.9448E−06 | 8.4213E−08 |
| R6 | −6.5124E+00 | 2.9290E−03 | −1.6953E−03 | 9.6389E−04 | −2.3428E−04 | 3.2577E−05 | −2.4368E−06 | 7.4744E−08 |
| R7 | — | — | — | — | — | — | — | — |
| R8 | — | — | — | — | — | — | — | — |
| R9 | 3.2549E−01 | −5.5661E−03 | 6.5346E−04 | −1.9589E−04 | 5.4990E−05 | −9.9610E−06 | 9.6930E−07 | −3.8653E−08 |
| R10 | −1.1348E+00 | 3.6127E−04 | −1.1343E−04 | 5.8739E−05 | −1.8762E−05 | 3.4987E−06 | −3.3425E−07 | 1.3007E−08 |
| R11 | — | — | — | — | — | — | — | — |
| R12 | — | — | — | — | — | — | — | — |
| R13 | — | — | — | — | — | — | — | — |
| R14 | — | — | — | — | — | — | — | — |
| R15 | −4.8735E−01 | 1.6486E−03 | 1.5025E−04 | −4.4037E−05 | 8.9871E−06 | −1.0340E−06 | 6.2087E−08 | −1.5113E−09 |
| R16 | −3.0807E+01 | −7.8264E−03 | 2.2895E−03 | −4.2858E−04 | 5.8303E−05 | −4.9779E−06 | 2.3764E−07 | −4.8267E−09 |

A4, A6, A8, A10, A12, A14, and A16 represent aspheric coefficients, c represents a curvature at the center of the optical surface, r represents a vertical distance between a point on the aspheric curve and the optical axis, and z represents a depth of the aspheric (a vertical distance between a point on the aspheric at a distance x from the optical axis and a tangent plane tangent to a vertex on the aspheric optical axis).

$$z=(cr^2)/\{1+[1-(k+1)(c^2r^2)]^{1/2}\}+A4r^4+A6r^6+A8r^8+A10r^{10}+A12r^{12}+A14r^{14}+A16r^{16}; \quad (1)$$

For convenience, the aspheric of each lens surface uses the aspheric shown in the above formula (1). However, the present disclosure is not limited to the aspheric polynomial form represented by the formula (1).

Table 3 and Table 4 show design data of inflection points and arrest points of each lens in the camera optical lens 10 according to the first embodiment of the present disclosure. Where P1R1 and P1R2 represent the object-side surface and the image-side surface of the first lens L1, respectively. P2R1 and P2R2 represent the object-side surface and the image-side surface of the second lens L2, respectively. P3R1 and P3R2 represent the object-side surface and the image-side surface of the third lens L3, respectively. P4R1 and P4R2 represent the object-side surface and the image-side surface of the fourth lens L4, respectively. P5R1 and P5R2 represent the object-side surface and the image-side surface of the fifth lens L5, respectively. P6R1 and P6R2 represent the object-side surface and the image-side surface of the sixth lens L6, respectively. P7R1 and P7R2 represent the object-side surface and the image-side surface of the seventh lens L7, respectively. P8R1 and P8R2 represent the object-side surface and the image-side surface of the eighth lens L8, respectively. Corresponding data in the column "inflection point position" is a vertical distance from the inflection point disposed on the surface of each lens to the optical axis of the camera optical lens 10. Corresponding data in the column "arrest point position" is a vertical distance from the arrest point disposed on the surface of each lens to the optical axis of the camera optical lens 10.

TABLE 3

| | Inflection Point Number | Inflection Point Position 1 | Inflection Point Position 2 |
|---|---|---|---|
| P1R1 | 0 | — | — |
| P1R2 | 0 | — | — |
| P2R1 | 0 | — | — |
| P2R2 | 0 | — | — |
| P3R1 | 1 | 2.725 | — |
| P3R2 | 0 | — | — |
| P4R1 | 0 | — | — |
| P4R2 | 0 | — | — |
| P5R1 | 0 | — | — |
| P5R2 | 0 | — | — |
| P6R1 | 0 | — | — |
| P6R2 | 0 | — | — |
| P7R1 | 0 | — | — |
| P7R2 | 0 | — | — |
| P8R1 | 1 | 3.565 | — |
| P8R2 | 2 | 2.045 | 3.545 |

TABLE 4

| | Arrest Point Number | Arrest Point Position 1 | Arrest Point Position 2 |
|---|---|---|---|
| P1R1 | 0 | — | — |
| P1R2 | 0 | — | — |
| P2R1 | 0 | — | — |
| P2R2 | 0 | — | — |
| P3R1 | 0 | — | — |
| P3R2 | 0 | — | — |
| P4R1 | 0 | — | — |
| P4R2 | 0 | — | — |
| P5R1 | 0 | — | — |
| P5R2 | 0 | — | — |
| P6R1 | 0 | — | — |
| P6R2 | 0 | — | — |
| P7R1 | 0 | — | — |
| P7R2 | 0 | — | — |
| P8R1 | 0 | — | — |
| P8R2 | 2 | 3.245 | 3.695 |

Figure 2:
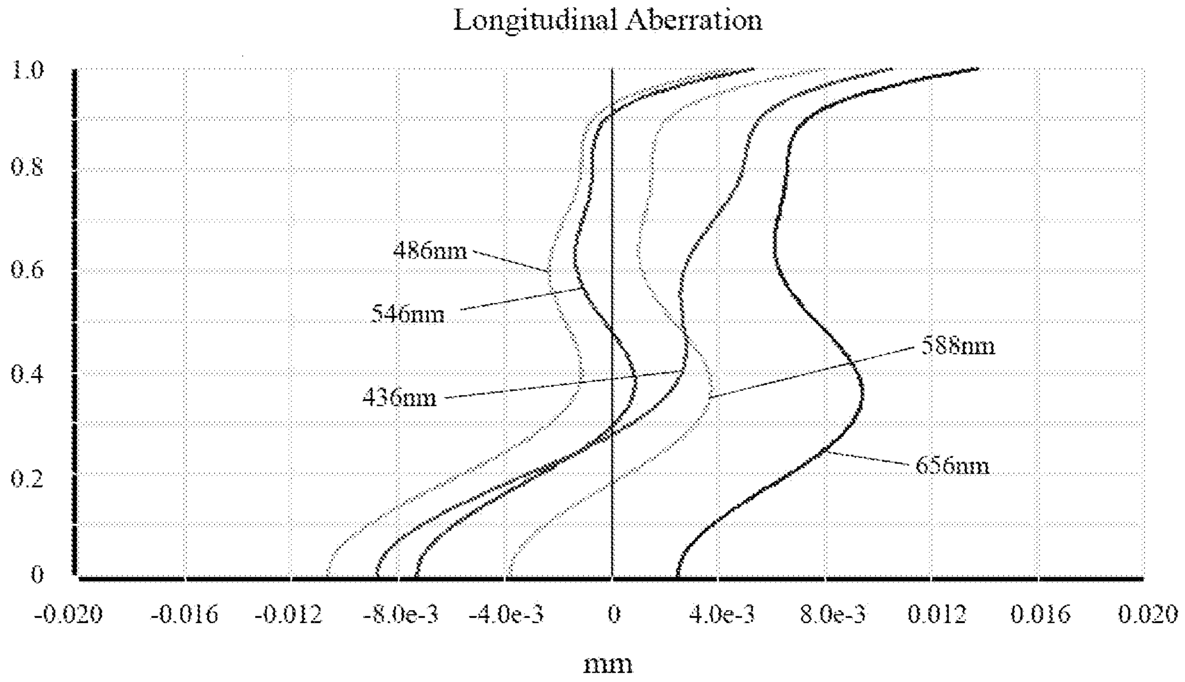
FIG. 2 is a schematic diagram of longitudinal aberration of the camera optical lens shown in FIG. 1.
Figure 3:
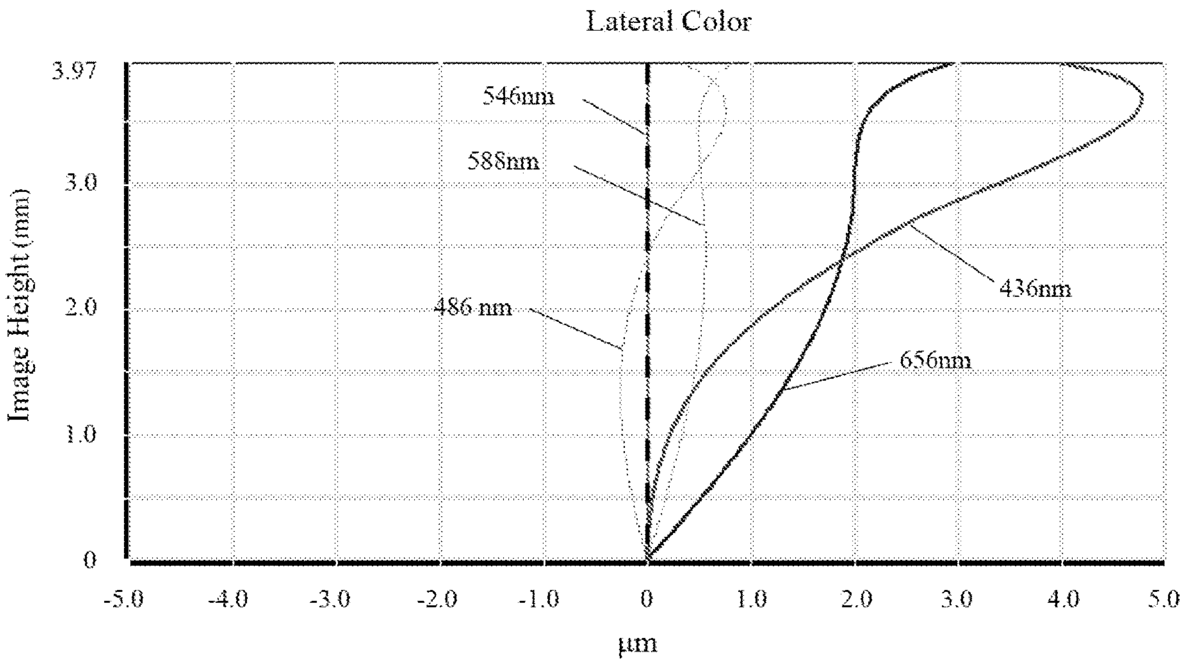
FIG. 3 is a schematic diagram of lateral color of the camera optical lens shown in FIG. 1.
Figure 4:
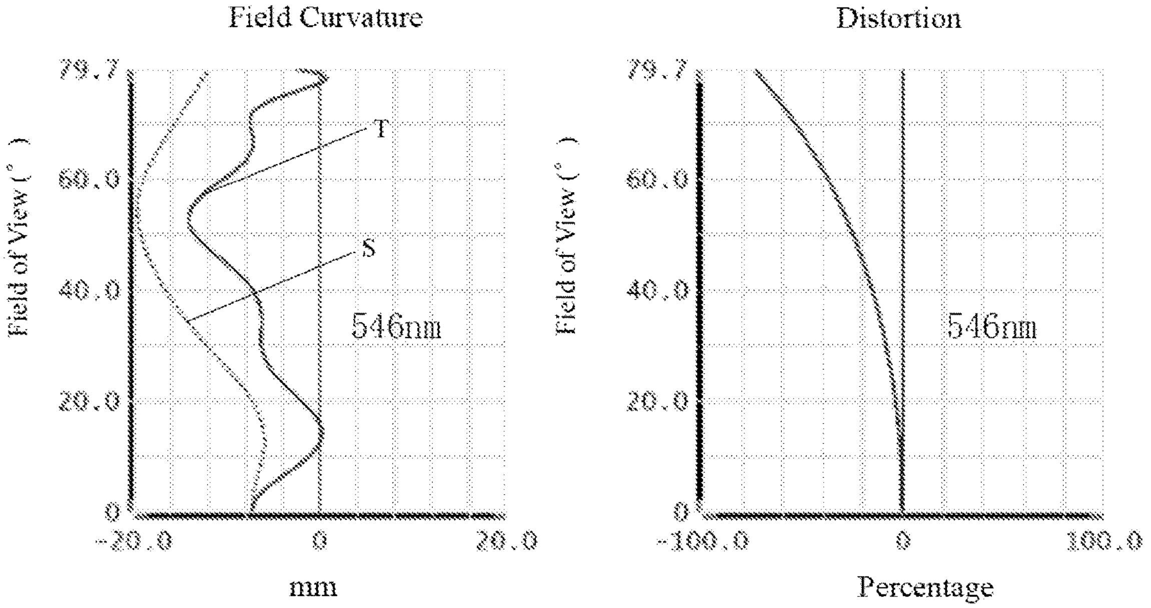
FIG. 4 is a schematic diagram of field curvature and distortion of the camera optical lens shown in FIG. 1.

FIG. 2 shows a schematic diagram of longitudinal aberration of light with wavelengths 656 nm, 588 nm, 546 nm, 486 nm, and 436 nm after passing through the camera optical lens 10 according to the first embodiment, and FIG. 3 shows a schematic diagram of lateral color of light with wavelengths 656 nm, 588 nm, 546 nm, 486 nm, and 436 nm after passing through the camera optical lens 10 according to the first embodiment. FIG. 4 shows a schematic diagram of field curvature and distortion of light with a wavelength 546 nm after passing through the camera optical lens 10 according to the first embodiment. The field curvature S in FIG. 4 is a field curvature in a sagittal direction, and T is a field curvature in a meridian direction.

The following Table 21 shows various values in the first embodiment, the second embodiment, the third embodiment, the fourth embodiment, and the fifth embodiment and values corresponding to parameters specified in the relational expression (relational expression).

As shown in Table 21, the first embodiment satisfies each relational expression.

In this embodiment, an entrance pupil diameter ENPD of the camera optical lens 10 is 1.527 mm, a full field of view image height IH is 3.968 mm, and a field of view FOV in a diagonal direction is 159.39°. The camera optical lens 10 meets the design requirements of the large aperture and the ultra-wide angle, effectively correcting both the on-axis and off-axis chromatic aberration thereof, and the camera optical lens 10 has excellent optical characteristics.

Second Embodiment

Figure 5:
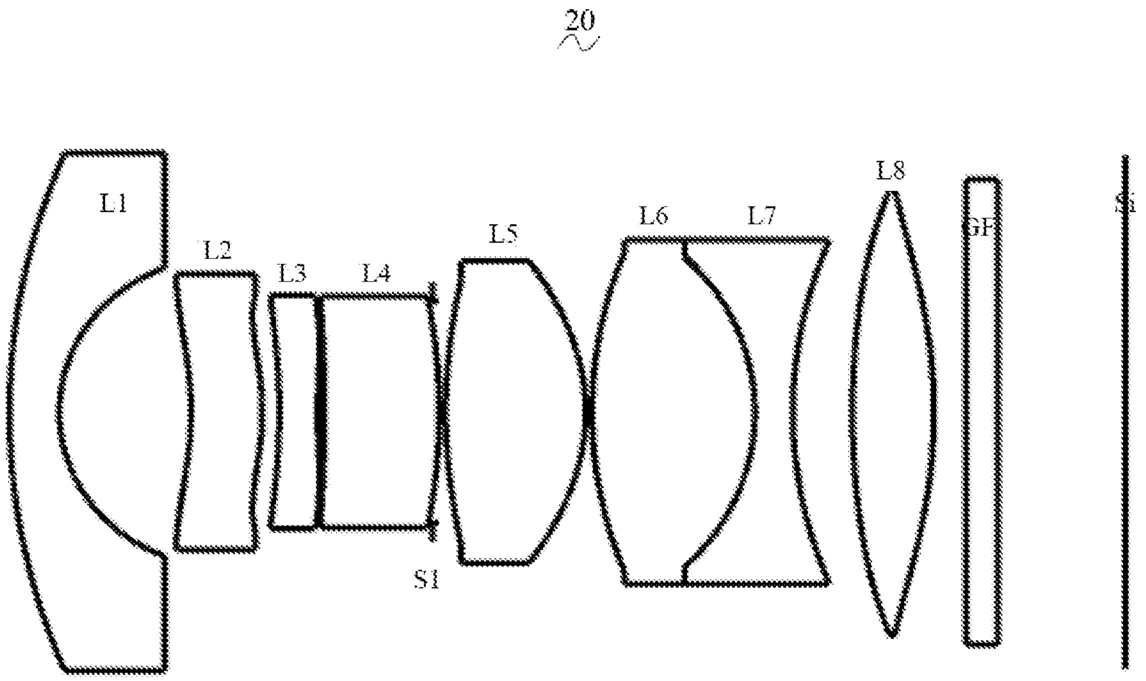
FIG. 5 is a schematic structural diagram of a camera optical lens according to a second embodiment of the present disclosure.

The second embodiment is substantially the same as the first embodiment, and the reference sign meaning have the same meaning as the first embodiment. The structural form of a camera optical lens 20 of the second embodiment is shown in FIG. 5, and only differences are listed below.

In this embodiment, an object-side surface of a fourth lens L4 is concave in a paraxial region, and an image-side surface of a fourth lens L4 is convex in the paraxial region.

Table 5 and Table 6 show design data of the camera optical lens 20 according to the second embodiment of the present disclosure.

TABLE 5

| | R | | d | | nd | | vd |
|---|---|---|---|---|---|---|---|
| S1 | ∞ | d0 | −6.619 | | | | |
| R1 | 10.827 | d1 | 0.781 | n1 | 1.8478 | v1 | 40.83 |
| R2 | 2.514 | d2 | 2.060 | | | | |
| R3 | −5.373 | d3 | 1.116 | n2 | 1.8514 | v2 | 40.07 |
| R4 | −4.144 | d4 | 0.270 | | | | |
| R5 | −10.003 | d5 | 0.600 | n3 | 1.4959 | v3 | 81.65 |
| R6 | 9.355 | d6 | 0.100 | | | | |
| R7 | −28.308 | d7 | 1.800 | n4 | 2.0007 | v4 | 25.44 |
| R8 | −10.011 | d8 | 0.100 | | | | |
| R9 | 8.207 | d9 | 2.193 | n5 | 1.4959 | v5 | 81.65 |
| R10 | −3.488 | d10 | 0.100 | | | | |
| R11 | 7.002 | d11 | 2.550 | n6 | 1.4970 | v6 | 81.59 |
| R12 | −3.480 | d12 | 0.000 | | | | |
| R13 | −3.48 | d13 | 0.594 | n7 | 1.8052 | v7 | 25.48 |
| R14 | 7.186 | d14 | 0.932 | | | | |
| R15 | 14.146 | d15 | 1.277 | n8 | 1.7738 | v8 | 47.17 |
| R16 | −8.646 | d16 | 0.500 | | | | |
| R17 | ∞ | d17 | 0.500 | ng | 1.5233 | vg | 54.52 |
| R18 | ∞ | d18 | 2.000 | | | | |

Table 6 shows aspheric data of each lens in the camera optical lens 20 according to the second embodiment of the present disclosure.

TABLE 6

| | Conic Coefficient | Aspheric coefficient | | | | | | |
|---|---|---|---|---|---|---|---|---|
| | k | A4 | A6 | A8 | A10 | A12 | A14 | A16 |
| R1 | — | — | — | — | — | — | — | — |
| R2 | — | — | — | — | — | — | — | — |
| R3 | −5.2274E−01 | 1.0247E−02 | 2.7696E−04 | −8.3043E−05 | −1.9425E−06 | 6.5918E−07 | −4.9372E−08 | 1.5780E−09 |
| R4 | −9.4799E+00 | 1.3694E−02 | −6.3031E−04 | 4.6388E−04 | −3.2404E−05 | 3.1668E−07 | 8.3961E−08 | −4.6585E−09 |
| R5 | 1.5569E+00 | 8.3616E−03 | −5.6819E−03 | 2.2107E−03 | −4.0934E−04 | 4.3925E−05 | −2.9448E−06 | 8.4213E−08 |
| R6 | −9.7036E+01 | −1.8119E−02 | 1.2480E−03 | 5.9065E−04 | −2.1333E−04 | 3.2577E−05 | −2.4368E−06 | 7.4744E−08 |
| R7 | — | — | — | — | — | — | — | — |
| R8 | — | — | — | — | — | — | — | — |
| R9 | 6.1645E+00 | −5.4042E−03 | 5.3088E−04 | −1.6399E−04 | 5.1498E−05 | −9.9610E−06 | 9.6930E−07 | −3.8653E−08 |
| R10 | −1.0018E+00 | −8.0577E−05 | −1.6366E−04 | 6.8304E−05 | −1.9351E−05 | 3.4987E−06 | −3.3425E−07 | 1.3007E−08 |
| R11 | — | — | — | — | — | — | — | — |
| R12 | — | — | — | — | — | — | — | — |
| R13 | — | — | — | — | — | — | — | — |
| R14 | — | — | — | — | — | — | — | — |
| R15 | −6.3743E+00 | 8.0980E−04 | 6.9661E−05 | −4.0093E−05 | 8.9532E−06 | −1.0340E−06 | 6.2087E−08 | −1.5113E−09 |
| R16 | −5.4530E+01 | −8.6147E−03 | 2.2111E−03 | −4.3291E−04 | 5.8623E−05 | −4.9779E−06 | 2.3764E−07 | −4.8267E−09 |

Table 7 and Table 8 show design data of inflection points and arrest points of each lens in the camera optical lens 20 according to the second embodiment of the present disclosure.

TABLE 7

| | Inflection Point Number | Inflection Point Position 1 | Inflection Point Position 2 |
|---|---|---|---|
| P1R1 | 0 | — | — |
| P1R2 | 0 | — | — |
| P2R1 | 1 | 1.255 | — |
| P2R2 | 1 | 0.935 | — |
| P3R1 | 1 | 1.535 | — |
| P3R2 | 1 | 0.585 | — |
| P4R1 | 0 | — | — |
| P4R2 | 0 | — | — |
| P5R1 | 0 | — | — |
| P5R2 | 0 | — | — |
| P6R1 | 0 | — | — |
| P6R2 | 0 | — | — |
| P7R1 | 0 | — | — |
| P7R2 | 0 | — | — |
| P8R1 | 1 | 3.515 | — |
| P8R2 | 2 | 2.905 | 3.445 |

TABLE 8

| | Arrest Point Number | Arrest Point Position 1 |
|---|---|---|
| P1R1 | 0 | — |
| P1R2 | 0 | — |
| P2R1 | 0 | — |
| P2R2 | 1 | 1.585 |
| P3R1 | 0 | — |
| P3R2 | 1 | 1.085 |
| P4R1 | 0 | — |
| P4R2 | 0 | — |
| P5R1 | 0 | — |
| P5R2 | 0 | — |
| P6R1 | 0 | — |
| P6R2 | 0 | — |
| P7R1 | 0 | — |
| P7R2 | 0 | — |
| P8R1 | 0 | — |
| P8R2 | 0 | — |

Figure 6:
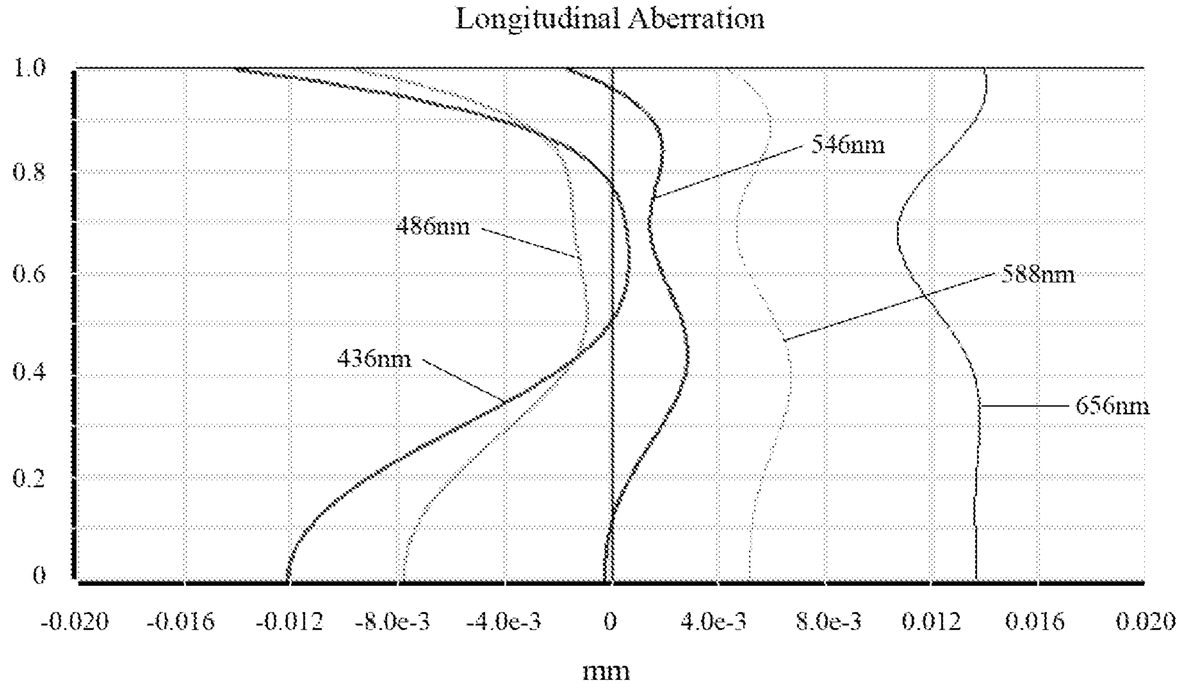
FIG. 6 is a schematic diagram of longitudinal aberration of the camera optical lens shown in FIG. 5.
Figure 7:
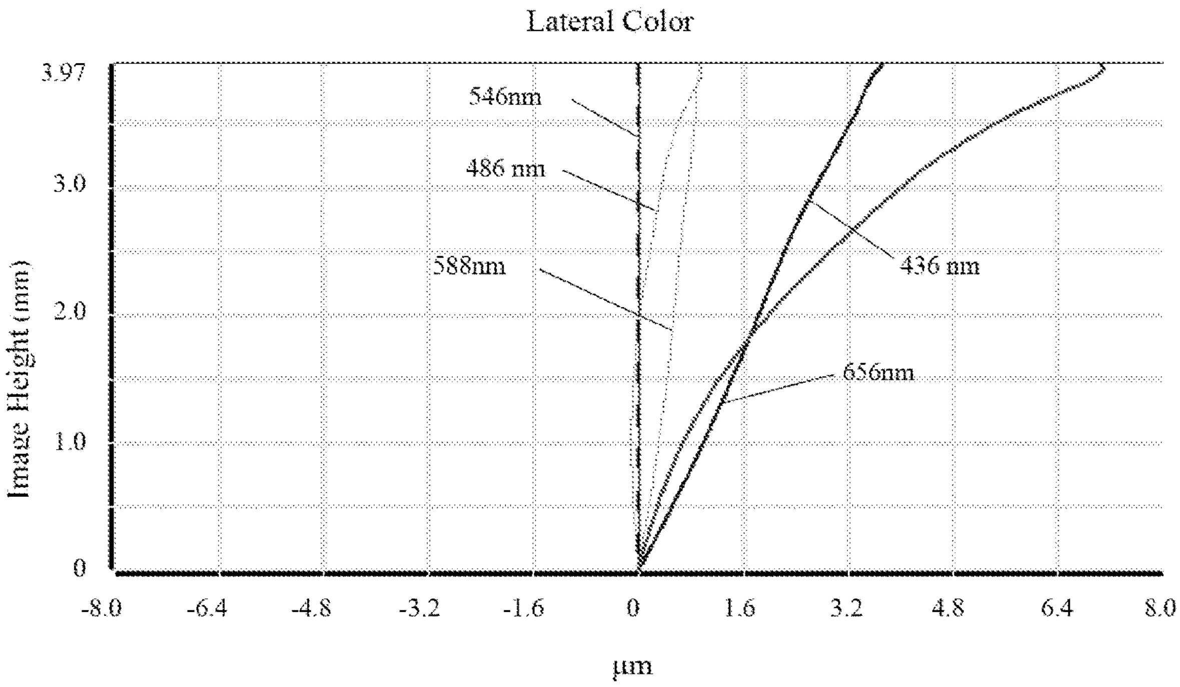
FIG. 7 is a schematic diagram of lateral color of the camera optical lens shown in FIG. 5.
Figure 8:
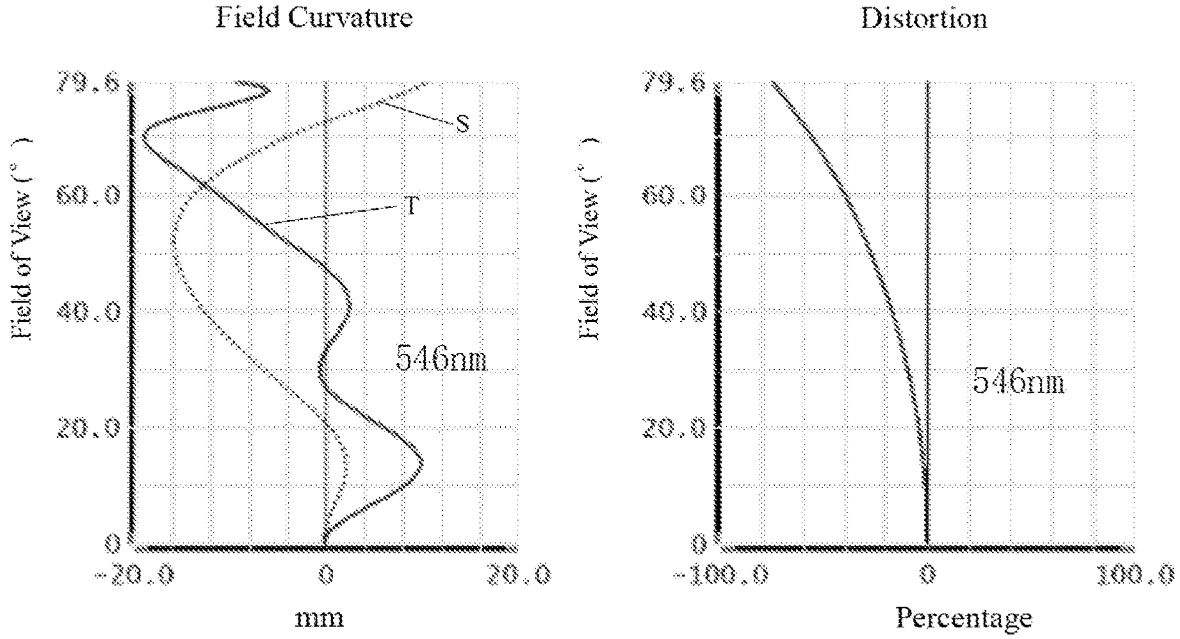
FIG. 8 is a schematic diagram of field curvature and distortion of the camera optical lens shown in FIG. 5.

FIG. 6 shows a schematic diagram of longitudinal aberration of light with wavelengths 656 nm, 588 nm, 546 nm, 486 nm, and 436 nm after passing through the camera optical lens 20 according to the second embodiment, and FIG. 7 shows a schematic diagram of lateral color of light with wavelengths 656 nm, 587 nm, 546 nm, 486 nm, and 435 nm after passing through the camera optical lens 20 according to the second embodiment. FIG. 8 shows a schematic diagram of field curvature and distortion of light with a wavelength 546 nm after passing through the camera optical lens 20 according to the second embodiment.

As shown in Table 21, the second embodiment satisfies each relational expression.

In this embodiment, an entrance pupil diameter ENPD of the camera optical lens 20 is 1.615 mm, a full field of view image height IH is 3.9686 mm, and a field of view FOV in a diagonal direction is 159.20°. The camera optical lens 20 meets design requirements of large aperture and ultra-wide angle, effectively correcting both the on-axis and off-axis chromatic aberration thereof, and the camera optical lens 20 has excellent optical characteristics.

Third Embodiment

Figure 9:
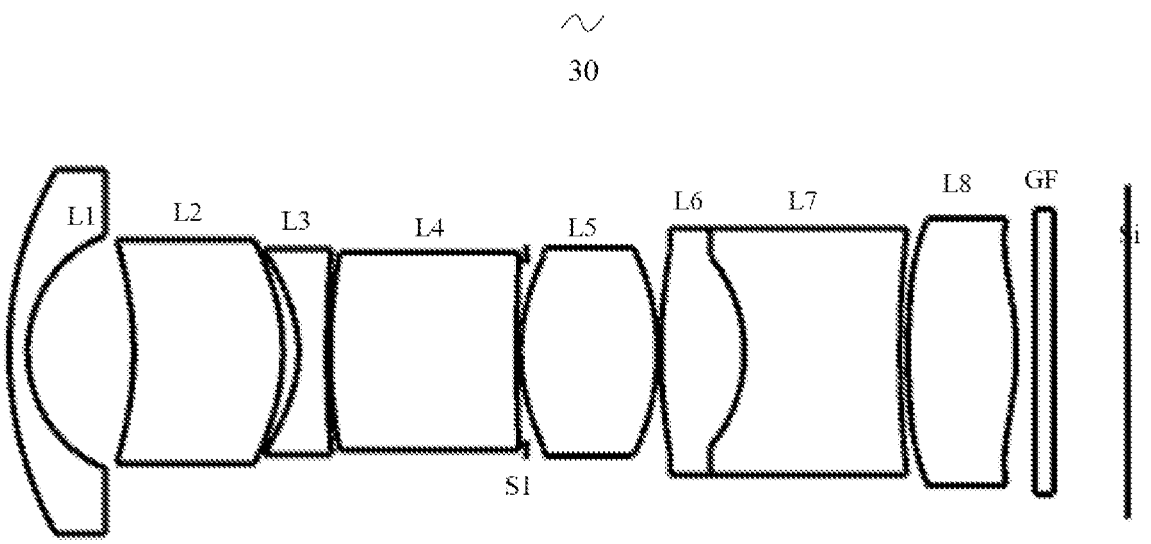
FIG. 9 is a schematic structural diagram of a camera optical lens according to a third embodiment of the present disclosure.

The third embodiment is substantially the same as the first embodiment, and the reference sign meaning have the same meaning as the first embodiment. The structural form of a camera optical lens 30 of the third embodiment is shown in FIG. 9, and only differences are listed below.

Table 9 and Table 10 show design data of the camera optical lens 30 according to the third embodiment of the present disclosure.

TABLE 9

| | R | | d | | nd | | vd |
|---|---|---|---|---|---|---|---|
| S1 | ∞ | d0 | −13.867 | | | | |
| R1 | 8.880 | d1 | 0.500 | n1 | 2.2000 | v1 | 29.13 |
| R2 | 3.082 | d2 | 2.844 | | | | |
| R3 | −7.833 | d3 | 4.000 | n2 | 1.8446 | v2 | 30.49 |
| R4 | −4.704 | d4 | 0.427 | | | | |
| R5 | −2.983 | d5 | 0.752 | n3 | 1.5017 | v3 | 79.53 |
| R6 | 22.482 | d6 | 0.100 | | | | |
| R7 | 12.383 | d7 | 5.000 | n4 | 2.0009 | v4 | 27.70 |
| R8 | 42.757 | d8 | 0.100 | | | | |
| R9 | 4.094 | d9 | 3.678 | n5 | 1.5070 | v5 | 69.43 |
| R10 | −5.392 | d10 | 0.100 | | | | |
| R11 | 13.847 | d11 | 2.233 | n6 | 1.4959 | v6 | 81.58 |
| R12 | −3.566 | d12 | 0.000 | | | | |
| R13 | −3.566 | d13 | 4.175 | n7 | 1.8569 | v7 | 25.47 |
| R14 | 24.526 | d14 | 0.221 | | | | |
| R15 | 24.222 | d15 | 2.902 | n8 | 1.7064 | v8 | 48.93 |
| R16 | −6.418 | d16 | 0.500 | | | | |
| R17 | ∞ | d17 | 0.500 | ng | 1.5233 | vg | 54.52 |
| R18 | ∞ | d18 | 2.000 | | | | |

Table 10 shows aspheric data of each lens in the camera optical lens 30 according to the third embodiment of the present disclosure.

TABLE 10

| | Conic Coefficient | Aspheric coefficient | | | | | | |
|---|---|---|---|---|---|---|---|---|
| | k | A4 | A6 | A8 | A10 | A12 | A14 | A16 |
| R1 | — | — | — | — | — | — | — | — |
| R2 | — | — | — | — | — | — | — | — |
| R3 | −1.4281E+01 | −1.5092E−03 | 3.2514E−05 | 6.7589E−06 | −4.0034E−06 | 6.5918E−07 | −4.9372E−08 | 1.5780E−09 |
| R4 | −1.4185E−01 | 5.8538E−03 | −1.4263E−03 | 2.4081E−04 | −2.0301E−05 | 3.1668E−07 | 8.3961E−08 | −4.6585E−09 |
| R5 | −1.3093E+00 | 1.1387E−02 | −5.6786E−03 | 1.8480E−03 | −3.6507E−04 | 4.3925E−05 | −2.9448E−06 | 8.4213E−08 |
| R6 | 1.9007E+01 | 1.3031E−04 | −1.8034E−03 | 9.3814E−04 | −2.3296E−04 | 3.2577E−05 | −2.4368E−06 | 7.4744E−08 |
| R7 | — | — | — | — | — | — | — | — |
| R8 | — | — | — | — | — | — | — | — |
| R9 | 3.7806E−01 | −5.7008E−03 | 3.0077E−04 | −1.6883E−04 | 5.1504E−05 | −9.9610E−06 | 9.6930E−07 | −3.8653E−08 |
| R10 | −1.1565E+00 | 3.3022E−04 | −1.9353E−04 | 5.8647E−05 | −1.9998E−05 | 3.4987E−06 | −3.3425E−07 | 1.3007E−08 |
| R11 | — | — | — | — | — | — | — | — |
| R12 | — | — | — | — | — | — | — | — |
| R13 | — | — | — | — | — | — | — | — |
| R14 | — | — | — | — | — | — | — | — |
| R15 | −9.9000E+01 | 3.5634E−03 | 1.8051E−05 | −4.1180E−05 | 8.9643E−06 | −1.0340E−06 | 6.2087E−08 | −1.5113E−09 |
| R16 | −2.6160E+01 | −6.2464E−03 | 2.3632E−03 | −4.4078E−04 | 5.8849E−05 | −4.9779E−06 | 2.3764E−07 | −4.8267E−09 |

Table 11 and Table 12 show design data of inflection points and arrest points of each lens in the camera optical lens 30 according to the third embodiment of the present disclosure.

TABLE 11

| | Inflection Point Number | Inflection Point Position 1 |
|---|---|---|
| P1R1 | 0 | — |
| P1R2 | 0 | — |
| P2R1 | 0 | — |
| P2R2 | 0 | — |
| P3R1 | 0 | — |
| P3R2 | 0 | — |
| P4R1 | 0 | — |
| P4R2 | 0 | — |
| P5R1 | 1 | 2.395 |
| P5R2 | 0 | — |
| P6R1 | 0 | — |
| P6R2 | 0 | — |
| P7R1 | 0 | — |
| P7R2 | 0 | — |
| P8R1 | 0 | — |
| P8R2 | 1 | 1.675 |

TABLE 12

| | Arrest Point Number | Arrest Point Position 1 |
|---|---|---|
| P1R1 | 0 | — |
| P1R2 | 0 | — |
| P2R1 | 0 | — |
| P2R2 | 0 | — |
| P3R1 | 0 | — |
| P3R2 | 0 | — |
| P4R1 | 0 | — |
| P4R2 | 0 | — |
| P5R1 | 0 | — |
| P5R2 | 0 | — |
| P6R1 | 0 | — |
| P6R2 | 0 | — |
| P7R1 | 0 | — |
| P7R2 | 0 | — |
| P8R1 | 0 | — |
| P8R2 | 1 | 2.815 |

Figure 10:
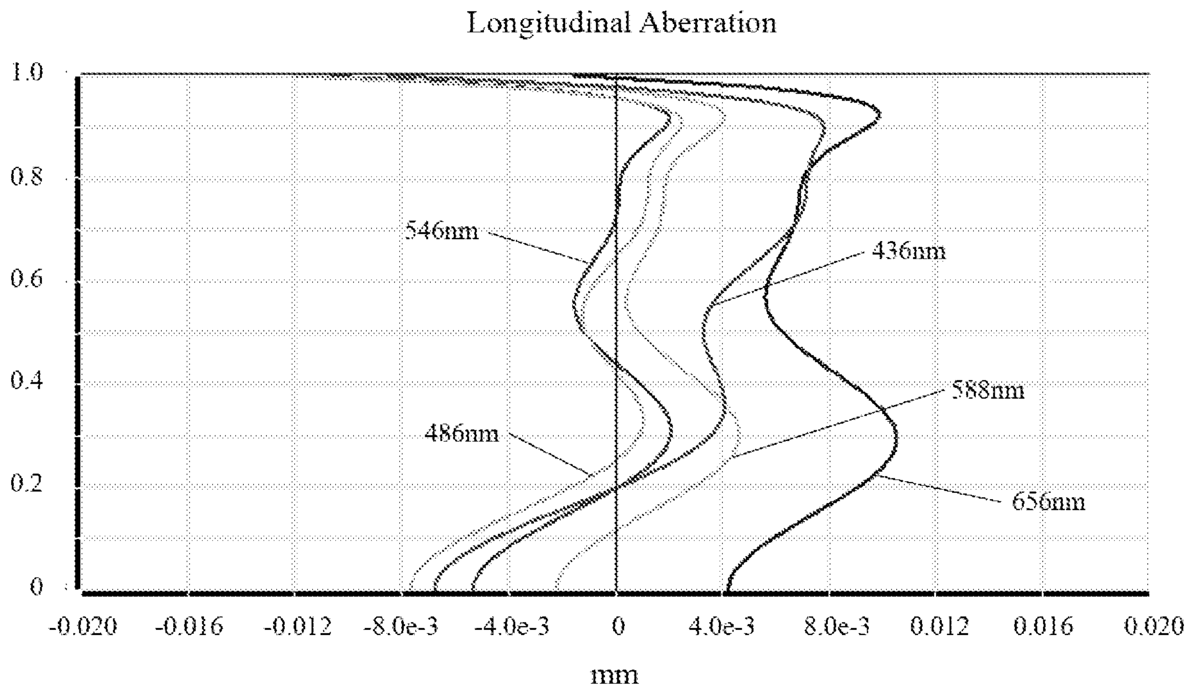
FIG. 10 is a schematic diagram of longitudinal aberration of the camera optical lens shown in FIG. 9.
Figure 11:
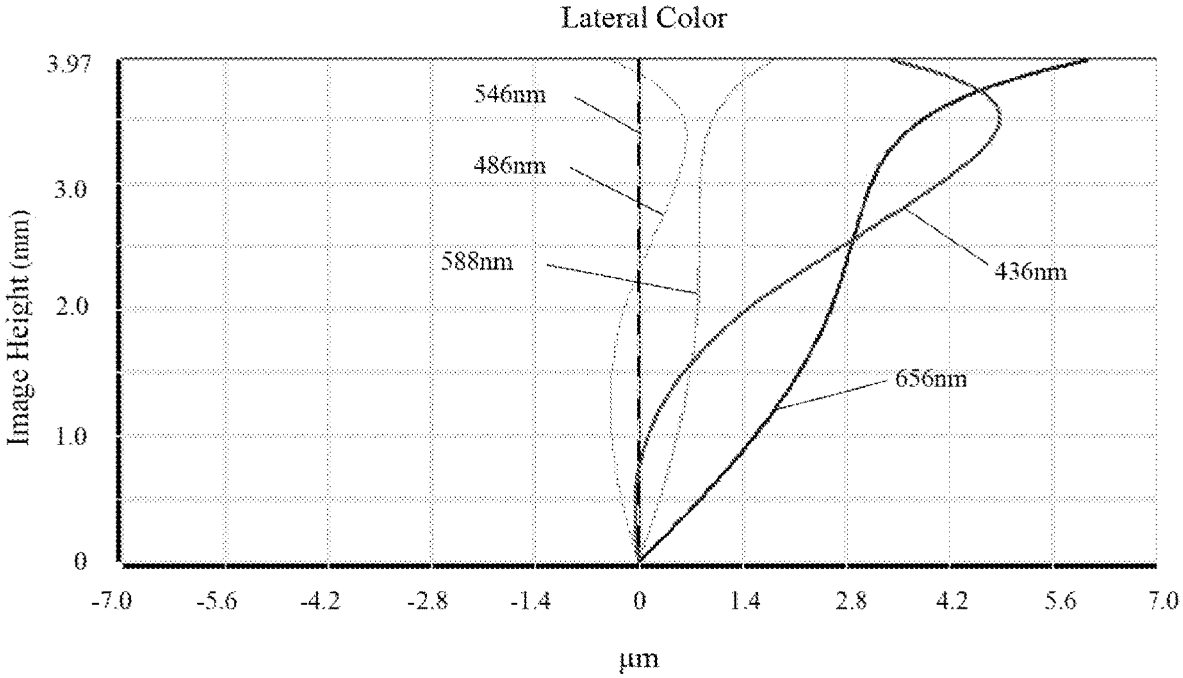
FIG. 11 is a schematic diagram of lateral color of the camera optical lens shown in FIG. 9.
Figure 12:
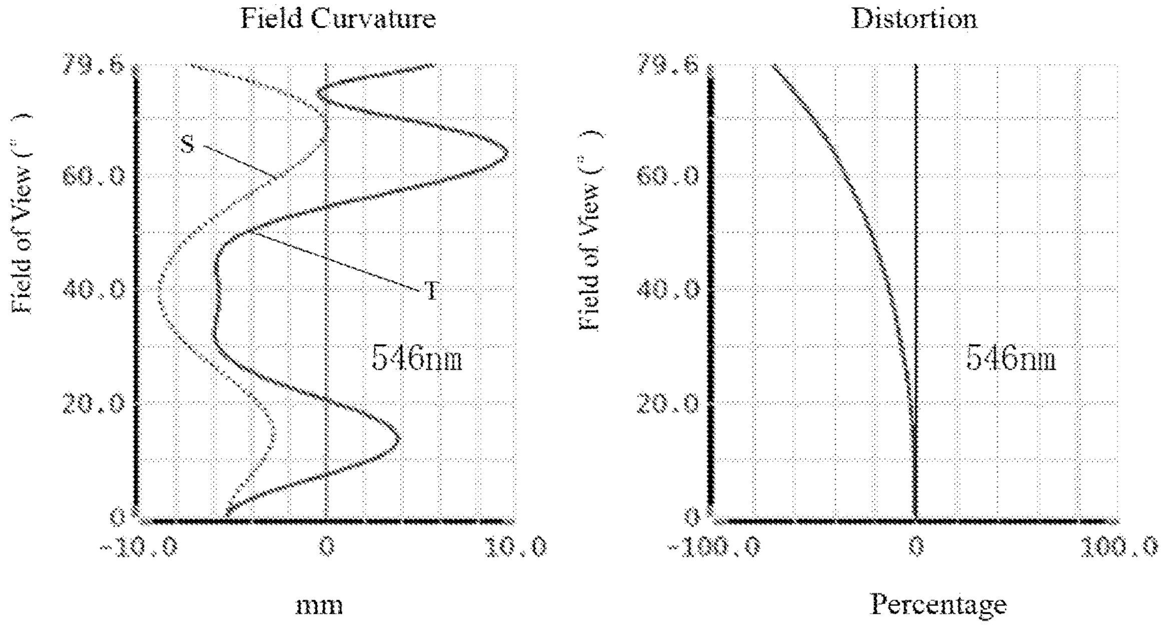
FIG. 12 is a schematic diagram of field curvature and distortion of the camera optical lens shown in FIG. 9.

FIG. 10 shows a schematic diagram of longitudinal aberration of light with wavelengths 656 nm, 588 nm, 546 nm, 486 nm, and 436 nm after passing through the camera optical lens 30 according to the third embodiment, and FIG. 11 shows a schematic diagram of lateral color of light with wavelengths 656 nm, 587 nm, 546 nm, 486 nm, and 435 nm after passing through the camera optical lens 30 according to the third embodiment. FIG. 12 shows a schematic diagram of field curvature and distortion of light with a wavelength 546 nm after passing through the camera optical lens 30 according to the third embodiment.

The following Table 21 lists values corresponding to each relational expression in this embodiment according to the above relational expressions. It is apparent that, the camera optical lens 30 of this embodiment satisfies the above relational expressions.

In this embodiment, an entrance pupil diameter ENPD of the camera optical lens 30 is 1.391 mm, a full field of view image height IH is 3.967 mm, and a field of view FOV in a diagonal direction is 159.20°. The camera optical lens 30 meets design requirements of large aperture and ultra-wide angle, effectively correcting both the on-axis and off-axis chromatic aberration thereof, and the camera optical lens 30 has excellent optical characteristics.

Fourth Embodiment

Figure 13:
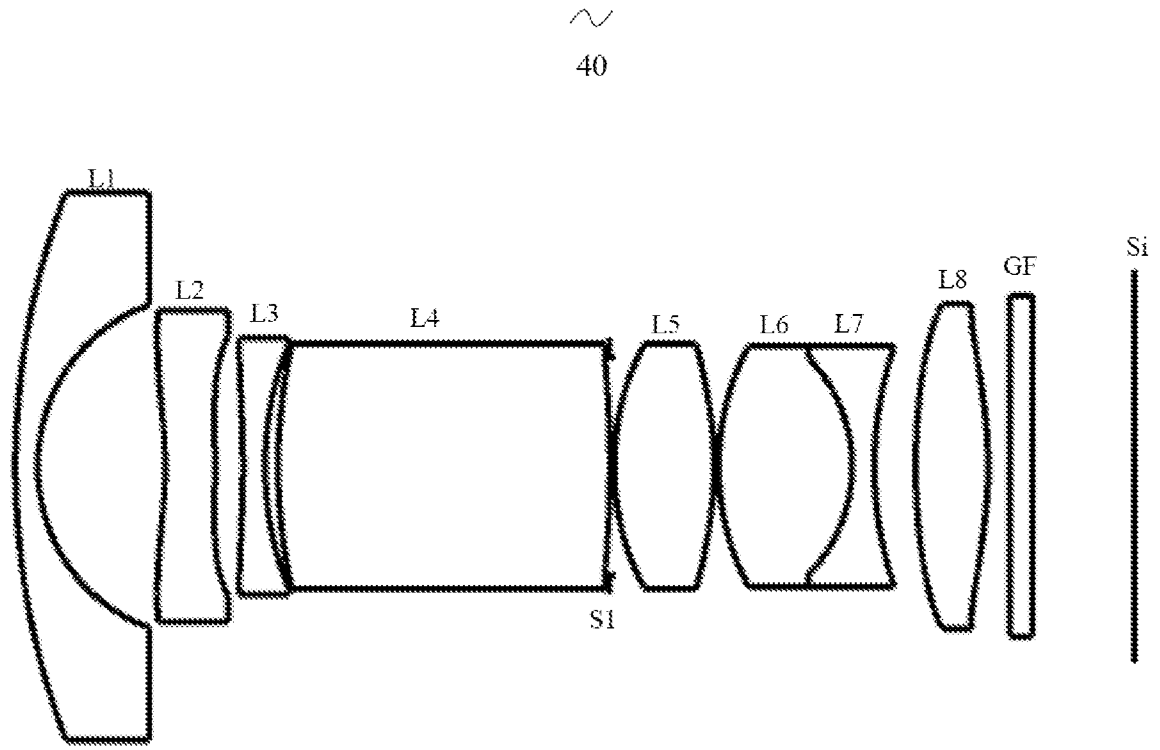
FIG. 13 is a schematic structural diagram of a camera optical lens according to a fourth embodiment of the present disclosure.

The fourth embodiment is substantially the same as the first embodiment, and the reference sign meaning have the same meaning as the first embodiment. The structural form of a camera optical lens 40 of the fourth embodiment is shown in FIG. 13, and only differences are listed below.

In this embodiment, the second lens L2 has a negative refractive power, and an image-side surface of a fourth lens L4 is convex in a paraxial region.

Table 13 and Table 14 show design data of the camera optical lens 40 according to the fourth embodiment of the present disclosure.

TABLE 13

| | R | | d | | nd | | vd |
|---|---|---|---|---|---|---|---|
| S1 | ∞ | d0 | −13.331 | | | | |
| R1 | 15.655 | d1 | 0.500 | n1 | 1.7009 | v1 | 24.82 |
| R2 | 3.621 | d2 | 2.865 | | | | |
| R3 | −7.587 | d3 | 1.114 | n2 | 2.0033 | v2 | 28.32 |
| R4 | −22.181 | d4 | 0.630 | | | | |
| R5 | −16.174 | d5 | 0.500 | n3 | 1.4959 | v3 | 81.58 |
| R6 | 7.702 | d6 | 0.291 | | | | |
| R7 | 11.129 | d7 | 7.450 | n4 | 1.9686 | v4 | 21.10 |
| R8 | −22.996 | d8 | 0.100 | | | | |
| R9 | 5.791 | d9 | 2.241 | n5 | 1.5153 | v5 | 75.98 |
| R10 | −7.378 | d10 | 0.100 | | | | |
| R11 | 5.238 | d11 | 3.000 | n6 | 1.5017 | v6 | 79.80 |
| R12 | −3.216 | d12 | 0.000 | | | | |
| R13 | −3.216 | d13 | 0.500 | n7 | 1.9747 | v7 | 23.68 |
| R14 | 7.631 | d14 | 0.928 | | | | |
| R15 | 13.932 | d15 | 1.622 | n8 | 1.9001 | v8 | 35.02 |
| R16 | −9.288 | d16 | 0.500 | | | | |
| R17 | ∞ | d17 | 0.500 | ng | 1.5233 | vg | 54.52 |
| R18 | ∞ | d18 | 0.276 | | | | |

Table 14 shows aspheric data of each lens in the camera optical lens 40 according to the fourth embodiment of the present disclosure.

TABLE 14

| | Conic Coefficient | Aspheric coefficient | | | | | | |
|---|---|---|---|---|---|---|---|---|
| | k | A4 | A6 | A8 | A10 | A12 | A14 | A16 |
| R1 | — | — | — | — | — | — | — | — |
| R2 | — | — | — | — | — | — | — | — |
| R3 | −2.6688E+01 | 3.4009E−03 | −1.9116E−04 | 2.6142E−05 | −5.3053E−06 | 6.4840E−07 | −4.1428E−08 | 1.0657E−09 |
| R4 | −9.9000E+01 | 1.1114E−02 | −1.5968E−03 | 2.8122E−04 | −2.3040E−05 | 2.7623E−07 | 7.0612E−08 | −3.4042E−09 |
| R5 | 4.8249E+00 | 1.1018E−02 | −5.3443E−03 | 1.8149E−03 | −3.6653E−04 | 4.3964E−05 | −2.9617E−06 | 8.6244E−08 |
| R6 | 5.2490E+00 | 5.1212E−03 | −3.0469E−03 | 1.0682E−03 | −2.4327E−04 | 3.1843E−05 | −2.3163E−06 | 7.2623E−08 |
| R7 | — | — | — | — | — | — | — | — |
| R8 | — | — | — | — | — | — | — | — |
| R9 | 2.1065E+00 | −1.4551E−04 | 1.2010E−04 | −1.4495E−04 | 5.0194E−05 | −1.0099E−05 | 1.0436E−06 | −4.4891E−08 |

TABLE 14-continued

| | Conic Coefficient | Aspheric coefficient | | | | | | |
|---|---|---|---|---|---|---|---|---|
| | k | A4 | A6 | A8 | A10 | A12 | A14 | A16 |
| R10 | −2.4360E+00 | 1.0148E−03 | −8.4544E−05 | 5.7830E−05 | −1.9379E−05 | 3.3852E−06 | −2.9786E−07 | 9.5372E−09 |
| R11 | — | — | — | — | — | — | — | — |
| R12 | — | — | — | — | — | — | — | — |
| R13 | — | — | — | — | — | — | — | — |
| R14 | — | — | — | — | — | — | — | — |
| R15 | −6.3452E+00 | 9.6154E−04 | 1.0576E−04 | −4.6888E−05 | 9.4179E−06 | −1.0191E−06 | 6.0046E−08 | −1.4306E−09 |
| R16 | −5.6374E+01 | −6.6445E−03 | 1.9774E−03 | −4.0381E−04 | 5.7032E−05 | −5.0191E−06 | 2.4605E−07 | −5.0005E−09 |

Table 15 and Table 16 show design data of inflection points and arrest points of each lens in the camera optical lens 40 according to the fourth embodiment of the present disclosure.

TABLE 15

| | Inflection Point Number | Inflection Point Position 1 | Inflection Point Position 2 |
|---|---|---|---|
| P1R1 | 0 | — | — |
| P1R2 | 0 | — | — |
| P2R1 | 1 | 1.305 | — |
| P2R2 | 1 | 0.595 | — |
| P3R1 | 2 | 1.475 | 2.225 |
| P3R2 | 0 | — | — |
| P4R1 | 0 | — | — |
| P4R2 | 0 | — | — |
| P5R1 | 0 | — | — |
| P5R2 | 0 | — | — |
| P6R1 | 0 | — | — |
| P6R2 | 0 | — | — |
| P7R1 | 0 | — | — |
| P7R2 | 0 | — | — |
| P8R1 | 0 | — | — |
| P8R2 | 1 | 2.335 | — |

TABLE 16

| | Arrest Point Number | Arrest Point Position 1 |
|---|---|---|
| P1R1 | 0 | — |
| P1R2 | 0 | — |
| P2R1 | 1 | 2.765 |
| P2R2 | 1 | 1.065 |
| P3R1 | 0 | — |
| P3R2 | 0 | — |
| P4R1 | 0 | — |
| P4R2 | 0 | — |
| P5R1 | 0 | — |
| P5R2 | 0 | — |
| P6R1 | 0 | — |
| P6R2 | 0 | — |
| P7R1 | 0 | — |
| P7R2 | 0 | — |
| P8R1 | 0 | — |
| P8R2 | 1 | 3.325 |

Figure 14:
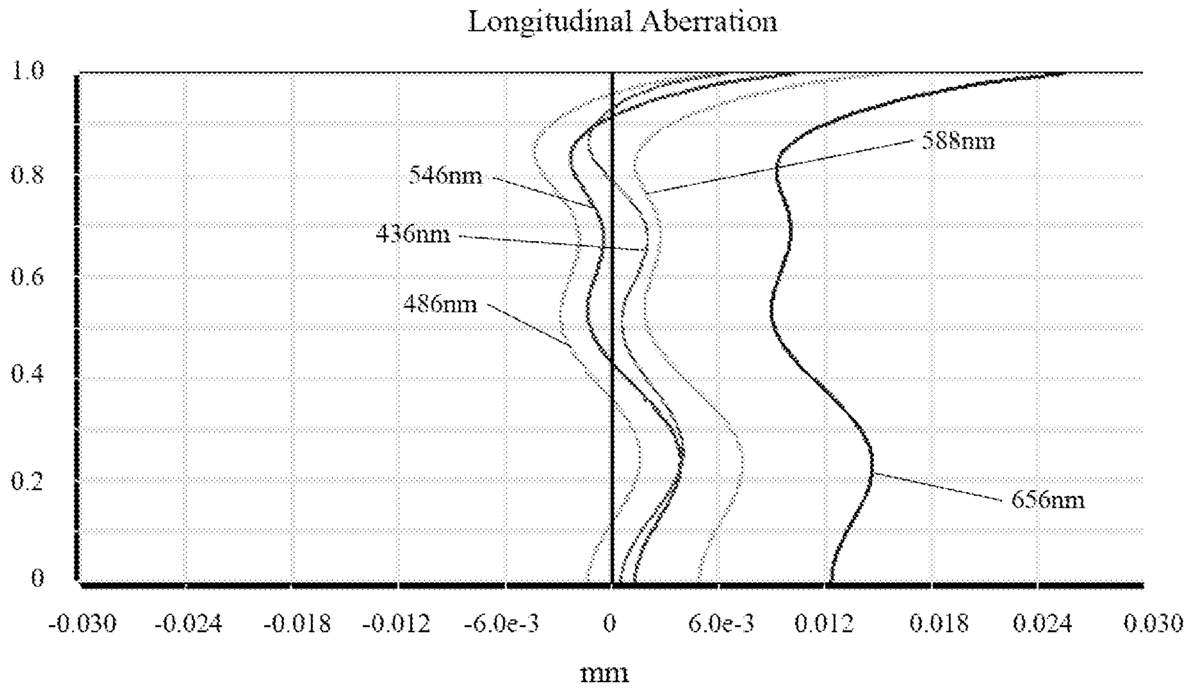
FIG. 14 is a schematic diagram of longitudinal aberration of the camera optical lens shown in FIG. 13.
Figure 15:
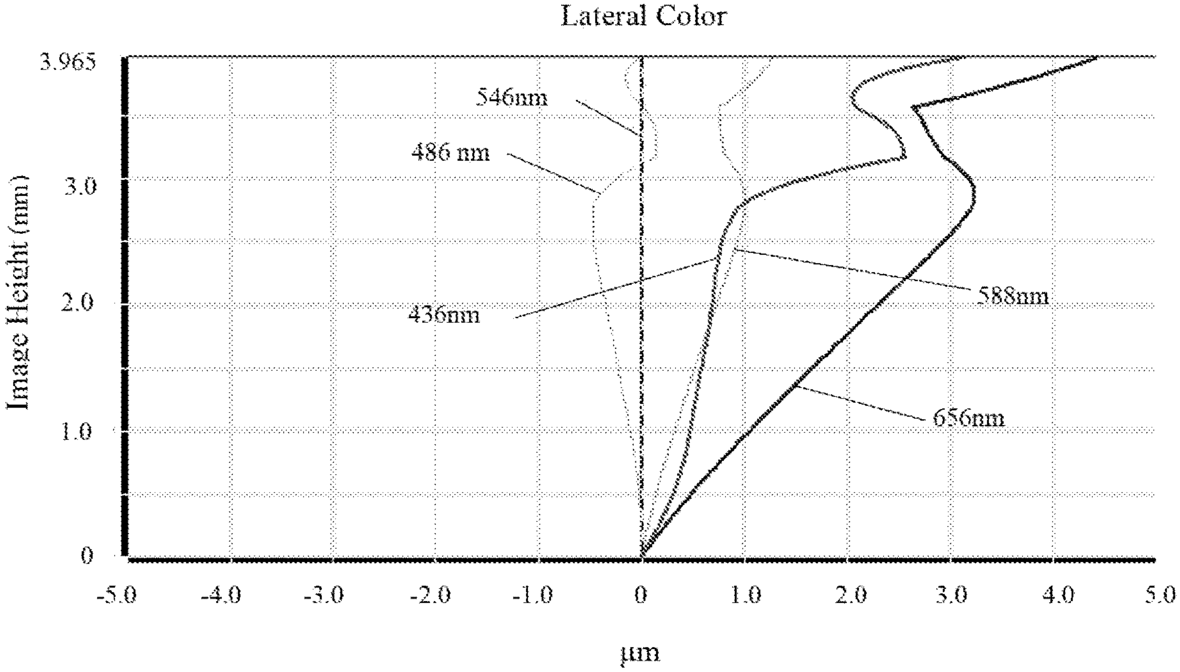
FIG. 15 is a schematic diagram of lateral color of the camera optical lens shown in FIG. 13.
Figure 16:
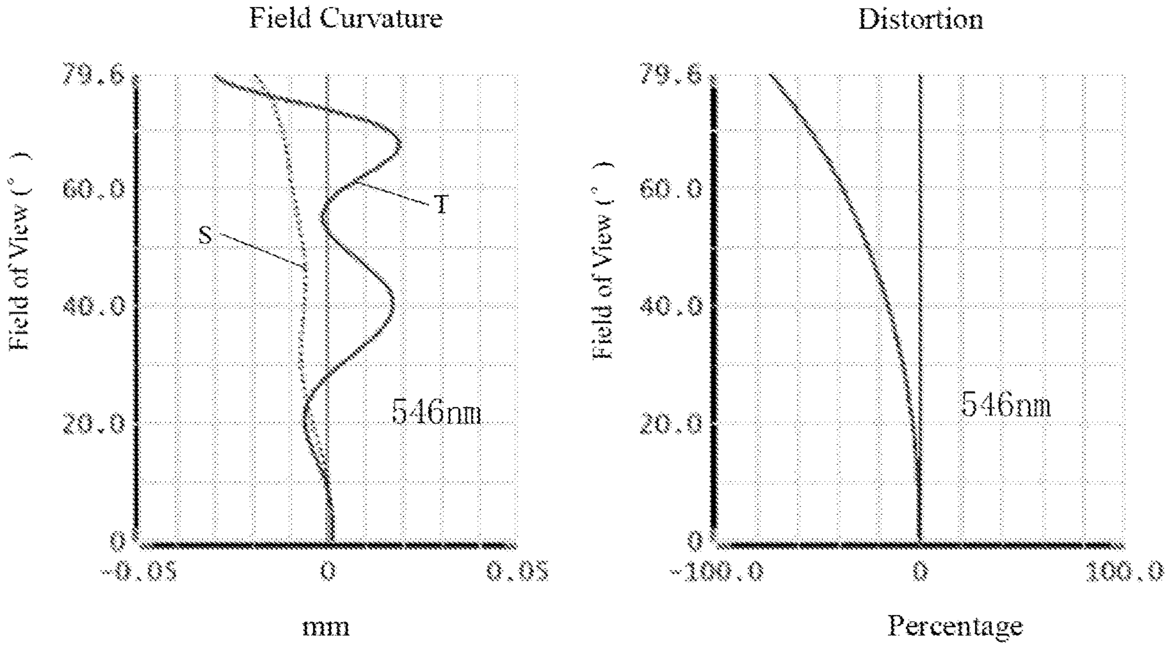
FIG. 16 is a schematic diagram of field curvature and distortion of the camera optical lens shown in FIG. 13.

FIG. 14 shows a schematic diagram of longitudinal aberration of light with wavelengths 656 nm, 588 nm, 546 nm, 486 nm, and 436 nm after passing through the camera optical lens 40 according to the fourth embodiment, and FIG. 15 shows a schematic diagram of lateral color of light with wavelengths 656 nm, 587 nm, 546 nm, 486 nm, and 435 nm after passing through the camera optical lens 40 according to the fourth embodiment. FIG. 16 shows a schematic diagram of field curvature and distortion of light with a wavelength 546 nm after passing through the camera optical lens 40 according to the fourth embodiment.

The following Table 21 lists values corresponding to each relational expression in this embodiment according to the above relational expressions. It is apparent that, the camera optical lens 40 of this embodiment satisfies the above relational expressions.

In this embodiment, an entrance pupil diameter ENPD of the camera optical lens 40 is 1.536 mm, a full field of view image height IH is 3.965 mm, and a field of view FOV in a diagonal direction is 159.20°. The camera optical lens 40 meets design requirements of large aperture and ultra-wide angle.

Fifth Embodiment

Figure 17:
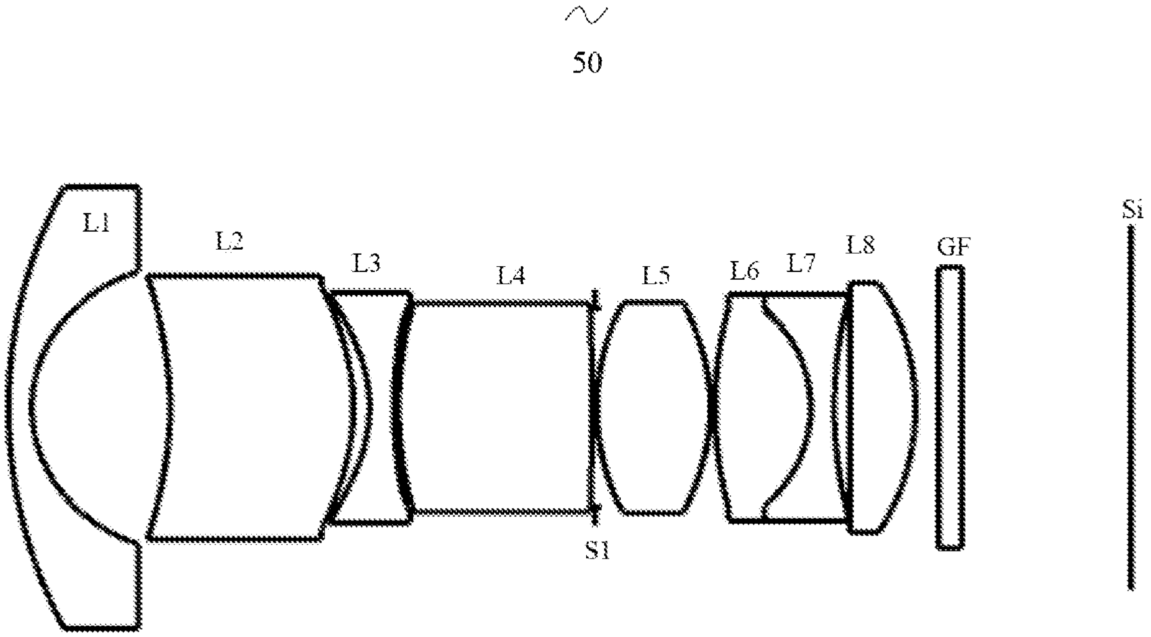
FIG. 17 is a schematic structural diagram of a camera optical lens according to a fifth embodiment of the present disclosure.

The fifth embodiment is substantially the same as the first embodiment, and the reference sign meaning have the same meaning as the first embodiment. The structural form of a camera optical lens 50 of the fifth embodiment is shown in FIG. 17, and only differences are listed below.

In this embodiment, an image-side surface of a fourth lens L4 is convex in a paraxial region.

Table 17 and Table 18 show design data of the camera optical lens 50 according to the fifth embodiment of the present disclosure.

TABLE 17

| | R | | d | | nd | | vd |
|---|---|---|---|---|---|---|---|
| S1 | ∞ | d0 | −12.496 | | | | |
| R1 | 11.518 | d1 | 0.500 | n1 | 1.9460 | v1 | 17.94 |
| R2 | 3.308 | d2 | 2.943 | | | | |
| R3 | −8.170 | d3 | 3.909 | n2 | 1.9093 | v2 | 34.23 |
| R4 | −4.848 | d4 | 0.345 | | | | |
| R5 | −3.332 | d5 | 0.518 | n3 | 1.5336 | v3 | 70.44 |
| R6 | 11.677 | d6 | 0.100 | | | | |
| R7 | 9.265 | d7 | 4.121 | n4 | 1.9628 | v4 | 20.21 |
| R8 | −68.377 | d8 | 0.100 | | | | |
| R9 | 5.328 | d9 | 2.421 | n5 | 1.5126 | v5 | 76.69 |
| R10 | −4.860 | d10 | 0.100 | | | | |
| R11 | 9.553 | d11 | 2.039 | n6 | 1.5101 | ve | 77.35 |
| R12 | −3.097 | d12 | 0.000 | | | | |
| R13 | −3.097 | d13 | 0.500 | n7 | 1.9695 | v7 | 21.24 |
| R14 | 10.650 | d14 | 0.344 | | | | |
| R15 | 587213000000.000 | d15 | 1.386 | n8 | 1.8171 | v8 | 43.38 |
| R16 | −5.872 | d16 | 0.500 | | | | |
| R17 | ∞ | d17 | 0.500 | ng | 1.5233 | vg | 54.52 |
| R18 | ∞ | d18 | 3.594 | | | | |

Table 18 shows aspheric data of each lens in the camera optical lens 50 according to the fifth embodiment of the present disclosure.

TABLE 18

| | Conic Coefficient | Aspheric coefficient | | | | | | |
|---|---|---|---|---|---|---|---|---|
| | k | A4 | A6 | A8 | A10 | A12 | A14 | A16 |
| R1 | — | — | — | — | — | — | — | — |
| R2 | — | — | — | — | — | — | — | — |
| R3 | −3.4852E−01 | 2.2632E−03 | −1.7650E−04 | 2.2054E−05 | −4.8566E−06 | 6.5918E−07 | −4.9372E−08 | 1.5780E−09 |
| R4 | −4.9304E−01 | 7.7857E−03 | −1.6830E−03 | 2.4581E−04 | −2.0008E−05 | 3.1668E−07 | 8.3961E−08 | −4.6585E−09 |
| R5 | −1.5312E+00 | 1.1058E−02 | −5.7319E−03 | 1.8566E−03 | −3.6530E−04 | 4.3925E−05 | −2.9448E−06 | 8.4213E−08 |
| R6 | −6.3621E+00 | 6.7280E−04 | −1.2275E−03 | 9.2591E−04 | −2.3218E−04 | 3.2577E−05 | −2.4368E−06 | 7.4744E−08 |
| R7 | — | — | — | — | — | — | — | — |
| R8 | — | — | — | — | — | — | — | — |
| R9 | 1.6978E+00 | −3.6691E−03 | 4.3881E−04 | −1.7091E−04 | 5.3081E−05 | −9.9610E−06 | 9.6930E−07 | −3.8653E−08 |
| R10 | −1.1636E+00 | 4.0856E−04 | −4.0501E−05 | 5.4495E−05 | −1.7782E−05 | 3.4987E−06 | −3.3425E−07 | 1.3007E−08 |
| R11 | — | — | — | — | — | — | — | — |
| R12 | — | — | — | — | — | — | — | — |
| R13 | — | — | — | — | — | — | — | — |
| R14 | — | — | — | — | — | — | — | — |
| R15 | — | — | — | — | — | — | — | — |
| R16 | −1.8861E+01 | −1.1540E−02 | 2.2014E−03 | −4.2262E−04 | 5.7397E−05 | −4.9779E−06 | 2.3764E−07 | −4.8267E−09 |

Table 19 and Table 20 show design data of inflection points and arrest points of each lens in the camera optical lens 50 according to the fifth embodiment of the present disclosure.

TABLE 19

| | Inflection Point Number | Inflection Point Position 1 |
|---|---|---|
| P1R1 | 0 | — |
| P1R2 | 0 | — |
| P2R1 | 0 | — |
| P2R2 | 0 | — |
| P3R1 | 1 | 2.485 |
| P3R2 | 0 | — |
| P4R1 | 0 | — |
| P4R2 | 0 | — |
| P5R1 | 0 | — |
| P5R2 | 0 | — |
| P6R1 | 0 | — |
| P6R2 | 0 | — |
| P7R1 | 0 | — |
| P7R2 | 0 | — |
| P8R1 | 0 | — |
| P8R2 | 0 | — |

TABLE 20

| | Arrest Point Number |
|---|---|
| P1R1 | 0 |
| P1R2 | 0 |
| P2R1 | 0 |
| P2R2 | 0 |
| P3R1 | 0 |
| P3R2 | 0 |

TABLE 20-continued

| | Arrest Point Number |
|---|---|
| P4R1 | 0 |
| P4R2 | 0 |
| P5R1 | 0 |
| P5R2 | 0 |
| P6R1 | 0 |
| P6R2 | 0 |
| P7R1 | 0 |
| P7R2 | 0 |
| P8R1 | 0 |
| P8R2 | 0 |

Figure 18:
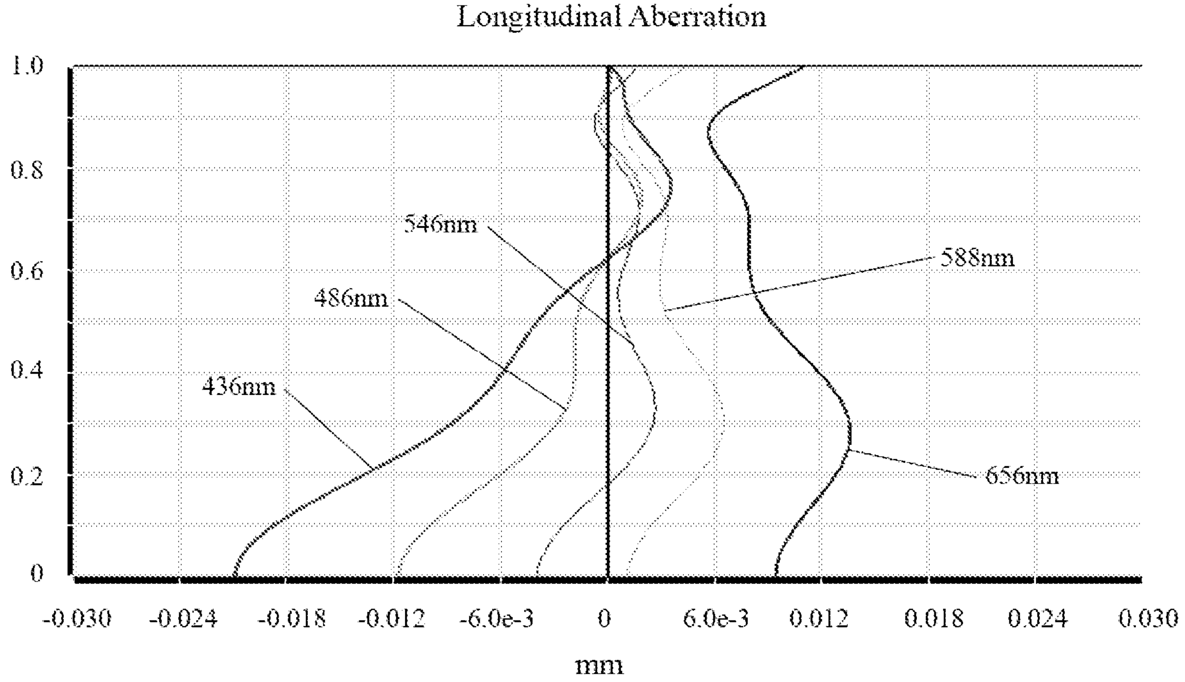
FIG. 18 is a schematic diagram of longitudinal aberration of the camera optical lens shown in FIG. 17.
Figure 19:
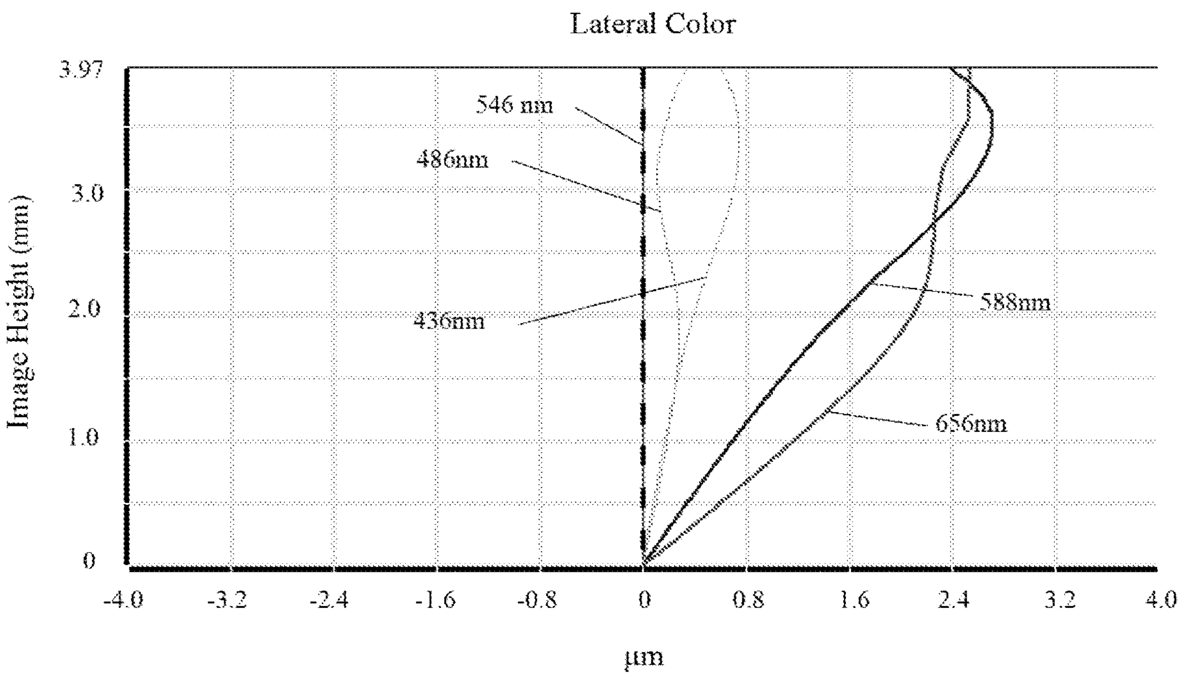
FIG. 19 is a schematic diagram of lateral color of the camera optical lens shown in FIG. 17.
Figure 20:
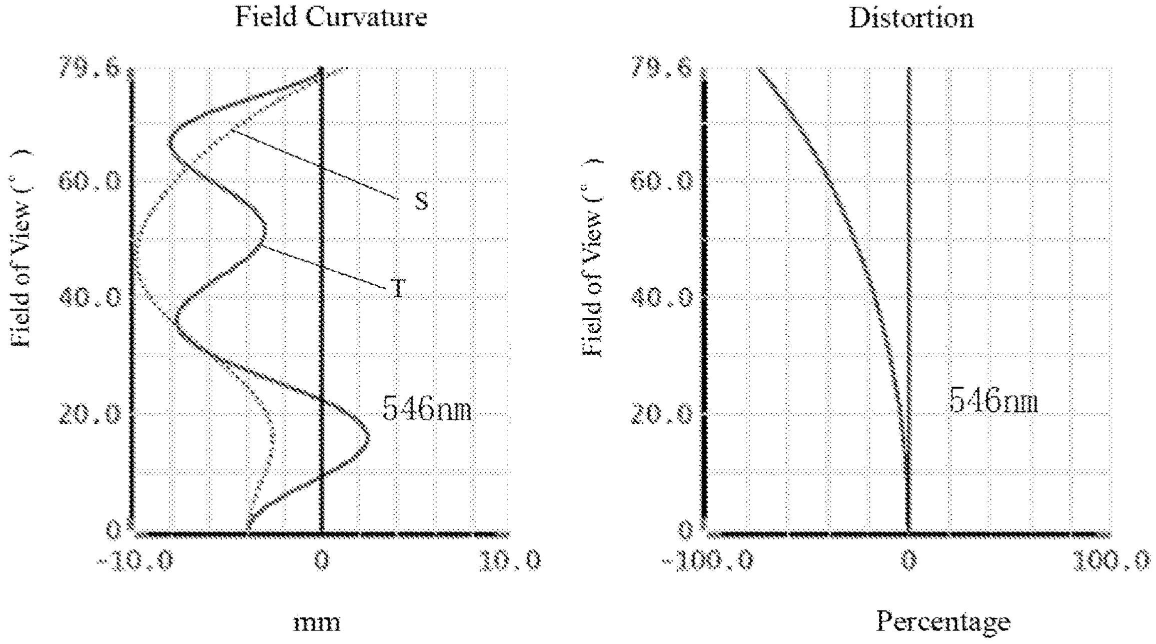
FIG. 20 is a schematic diagram of field curvature and distortion of the camera optical lens shown in FIG. 17.

FIG. 18 shows a schematic diagram of longitudinal aberration of light with wavelengths 656 nm, 588 nm, 546 nm, 486 nm, and 436 nm after passing through the camera optical lens 50 according to the fifth embodiment, and FIG. 19 shows a schematic diagram of lateral color of light with wavelengths 656 nm, 587 nm, 546 nm, 486 nm, and 435 nm after passing through the camera optical lens 50 according to the fifth embodiment. FIG. 20 shows a schematic diagram of field curvature and distortion of light with a wavelength 546 nm after passing through the camera optical lens 50 according to the fifth embodiment.

In this embodiment, an entrance pupil diameter ENPD of the camera optical lens 50 is 1.587 mm, a full field of view image height IH is 3.967 mm, and a field of view FOV in a diagonal direction is 159.21°. The camera optical lens 50 meets design requirements of large aperture and ultra-wide angle.

The following Table 21 lists values corresponding to each relational expression in this embodiment according to the above relational expressions. It is apparent that, the camera optical lens 50 of this embodiment satisfies the above relational expressions.

TABLE 21

| Parameters and Relational expression | First Embodiment | Second Embodiment | Third Embodiment | Fourth Embodiment | Fifth Embodiment |
|---|---|---|---|---|---|
| TTL/f | 8.37 | 6.01 | 11.99 | 9.08 | 8.38 |
| n1 | 2.00 | 1.85 | 2.20 | 1.70 | 1.95 |
| d7/d5 | 5.91 | 3.00 | 6.65 | 14.90 | 7.96 |
| f67/f | −3.05 | −3.19 | −4.00 | −2.78 | −2.01 |
| R15/R16 | −3.56 | −1.64 | −3.77 | −1.50 | −100002213896.46 |
| v6 − v7 | 56.08 | 56.11 | 56.11 | 56.12 | 56.11 |
| f | 2.749 | 2.907 | 2.505 | 2.765 | 2.856 |

TABLE 21-continued

| Parameters and Relational expression | First Embodiment | Second Embodiment | Third Embodiment | Fourth Embodiment | Fifth Embodiment |
|---|---|---|---|---|---|
| f1 | −4.391 | −4.014 | −4.096 | −6.774 | −4.992 |
| f2 | 7.050 | 14.911 | 8.713 | −11.853 | 8.336 |
| f3 | −4.896 | −9.620 | −5.182 | −10.417 | −4.784 |
| f4 | 14.136 | 14.614 | 15.949 | 8.584 | 8.602 |
| f5 | 4.873 | 5.248 | 5.262 | 6.663 | 5.377 |
| f6 | −272.440 | −122.468 | −16.240 | −40.185 | −11.523 |
| f7 | −4.622 | −4.837 | −6.830 | −3.528 | −4.051 |
| f8 | 7.231 | 7.074 | 7.440 | 6.361 | 7.147 |
| f67 | −8.388 | −9.272 | −10.019 | −7.695 | −5.741 |
| Fno | 1.800 | 1.800 | 1.801 | 1.800 | 1.800 |
| TTL | 23.000 | 17.473 | 30.032 | 25.117 | 23.920 |
| IH | 3.968 | 3.969 | 3.967 | 3.965 | 3.967 |
| FOV | 159.39 | 159.20 | 159.20 | 159.20 | 159.21 |

Those skilled in the art can understand that the above embodiments are specific embodiments for implementing the present disclosure, and in practical applications, various changes may be made in form and detail without departing from the spirit and scope of the present disclosure.

What is claimed is:

1. A camera optical lens, comprising from an object side to an image side: a first lens having a negative refractive power, a second lens having a refractive power, a third lens having a negative refractive power, a fourth lens having a positive refractive power, a fifth lens having a positive refractive power, a sixth lens having a negative refractive power, a seventh lens having a negative refractive power, and an eighth lens having a positive refractive power, wherein a total track length of the camera optical lens is TTL, a focal length of the camera optical lens is f, a refractive index of the first lens is n1, an on-axis thickness of the third lens is d5, an on-axis thickness of the fourth lens is d7, a combined focal length of the sixth lens and the seventh lens is f67, a central curvature radius of an object-side surface of the eighth lens is R15, a central curvature radius of an image-side surface of the eighth lens is R16, a focal length of the third lens is f3, a central curvature radius of an object-side surface of the third lens is R5, and a central curvature radius of an image-side surface of the third lens is R6, and following relational expressions are satisfied:

$$6.00 \leq TTL/f \leq 12.00;$$

$$1.70 \leq n1 \leq 2.20;$$

$$3.00 \leq d7/d5 \leq 15.00;$$

$$-4.00 \leq f67/f \leq -2.00;$$

$$R15/R16 \leq -1.5;$$

$$-7.53 \leq f3/f \leq -1.12;$$

$$-1.53 \leq (R5+R6)/(R5-R6) \leq 0.53; \text{ and}$$

$$0.01 \leq d5/TTL \leq 0.05.$$

2. The camera optical lens as described in claim 1, wherein an abbe number of the sixth lens is v6, and an abbe number of the seventh lens is v7, and a following relational expression is satisfied:

$$56.11 \leq v6 - v7.$$

3. The camera optical lens as described in claim 1, wherein an object-side surface of the first lens is convex in a paraxial region, and an image-side surface of the first lens is concave in the paraxial region, and wherein a focal length of the first lens is f1, a central curvature radius of an object-side surface of the first lens is R1, a central curvature radius of an image-side surface of the first lens is R2, and an on-axis thickness of the first lens is d1, and following relational expressions are satisfied:

$$-4.90 \leq f1/f \leq -0.92;$$

$$0.80 \leq (R1+R2)/(R1-R2) \leq 3.09; \text{ and}$$

$$0.01 \leq d1/TTL \leq 0.07.$$

4. The camera optical lens as described in claim 1, wherein an object-side surface of the second lens is concave in a paraxial region, and an image-side surface of the second lens is convex in the paraxial region, and wherein a focal length of the second lens is f2, a central curvature radius of an object-side surface of the second lens is R3, a central curvature radius of an image-side surface of the second lens is R4, and an on-axis thickness of the second lens is d3, and following relational expressions are satisfied:

$$-8.57 \leq f2/f \leq 7.69;$$

$$-4.08 \leq (R3+R4)/(R3-R4) \leq 11.62; \text{ and}$$

$$0.02 \leq d3/TTL \leq 0.25.$$

5. The camera optical lens as described in claim 1, wherein a focal length of the fourth lens is f4, a central curvature radius of an object-side surface of the fourth lens is R7, a central curvature radius of an image-side surface of the fourth lens is R8, and following relational expressions are satisfied:

$$1.51 \le f4/f \le 9.55;$$

$$-3.63 \le (R7+R8)/(R7-R8) \le 3.14; \text{ and}$$

$$0.05 \le d7/TTL \le 0.44.$$

6. The camera optical lens as described in claim 1, wherein an object-side surface of the fifth lens is convex in a paraxial region, and an image-side surface of the fifth lens is convex in the paraxial region, and wherein a focal length of the fifth lens is f5, a central curvature radius of an object-side surface of the fifth lens is R9, a central curvature radius of an image-side surface of the fifth lens is R10, and an on-axis thickness of the fifth lens is d9, and following relational expressions are satisfied:

$$0.89 \le f5/f \le 3.61;$$

$$-0.27 \le (R9+R10)/(R9-R10) \le 0.61; \text{ and}$$

$$0.04 \le d9/TTL \le 0.19.$$

7. The camera optical lens as described in claim 1, wherein an object-side surface of the sixth lens is convex in a paraxial region, and an image-side surface of the sixth lens is convex in the paraxial region, and wherein a focal length of the sixth lens is f6, a central curvature radius of an object-side surface of the sixth lens is R11, a central curvature radius of an image-side surface of the sixth lens is R12, and an on-axis thickness of the sixth lens is d11, and following relational expressions are satisfied:

$$-198.21 \le f6/f \le -2.69;$$

$$0.12 \le (R11+R12)/(R11-R12) \le 0.89; \text{ and}$$

$$0.04 \le d11/TTL \le 0.22.$$

8. The camera optical lens as described in claim 1, wherein an object-side surface of the seventh lens is concave in a paraxial region, and an image-side surface of the seventh lens is concave in the paraxial region, and wherein a focal length of the seventh lens is f7, a central curvature radius of an object-side surface of the seventh lens is R13, a central curvature radius of an image-side surface of the seventh lens is R14, and an on-axis thickness of the seventh lens is d13, and following relational expressions are satisfied:

$$-5.45 \le f7/f \le -0.85;$$

$$-1.49 \le (R13+R14)/(R13-R14) \le -0.17; \text{ and}$$

$$0.01 \le d13/TTL \le 0.21.$$

9. The camera optical lens as described in claim 1, wherein an object-side surface of the eighth lens is convex in a paraxial region, and an image-side surface of the eighth lens is convex in the paraxial region, and wherein a focal length of the eighth lens is f8, and an on-axis thickness of the eighth lens is d15, and following relational expressions are satisfied:

$$1.15 \le f8/f \le 4.46; \text{ and}$$

$$0.03 \le d15/TTL \le 0.14.$$

10. The camera optical lens as described in claim 1, wherein the first lens, the fourth lens, the sixth lens and the seventh lens are made of glass.

11. The camera optical lens as described in claim 1, wherein a focal number of the camera optical lens is Fno, and a field of view of the camera optical lens is FOV, and following relational expressions are satisfied:

$$Fno \le 1.80; \text{ and}$$

$$FOV \ge 159.00°.$$

* * * * *